USOO6191249B1

(12) United States Patent
Tanaka et al.

(10) Patent No.: US 6,191,249 B1
(45) Date of Patent: Feb. 20, 2001

(54) ELECTROPHOTOGRAPHIC PHOTOCONDUCTOR AND AROMATIC POLYCARBONATE RESIN FOR USE THEREIN

(75) Inventors: Chiaki Tanaka, Shizuoka-ken; Nozomu Tamoto, Numazu; Masaomi Sasaki, Susono; Kazukiyo Nagai, Numazu; Tomoyuki Shimada, Shizuoka-ken; Chihaya Adachi, Ueda; Akira Katayama, Shizuoka-ken; Mitsutoshi Anzai; Katsuhiro Morooka, both of Kawasaki, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/229,647

(22) Filed: Jan. 13, 1999

Related U.S. Application Data

(62) Division of application No. 08/767,426, filed on Dec. 16, 1996, now Pat. No. 5,942,363.

(30) Foreign Application Priority Data

| | | |
|---|---|---|
| Dec. 15, 1995 | (JP) | 7-327366 |
| Jan. 23, 1996 | (JP) | 8-009392 |
| Jan. 29, 1996 | (JP) | 8-012931 |

(51) Int. Cl.[7] .......... C08G 64/00
(52) U.S. Cl. .......... 528/196; 528/198
(58) Field of Search .......... 528/196, 198

(56) References Cited

U.S. PATENT DOCUMENTS 6,066,428 * 5/2000 Katayama .......... 430/73

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

An electrophotographic photoconductor includes an electroconductive support, and a photoconductive layer formed thereon containing as an effective component an aromatic polycarbonate resin having a repeat unit of formula (I), or two repeat units of formulae (II) and (III):

(I)

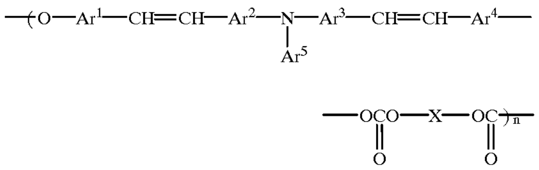

(II)

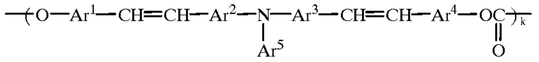

(III)

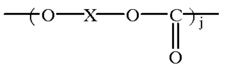

wherein $Ar^1$ to $Ar^3$, X, n, k and j are as specified in the specification.

22 Claims, 23 Drawing Sheets

ELECTROPHOTOGRAPHIC PHOTOCONDUCTOR AND AROMATIC POLYCARBONATE RESIN FOR USE THEREIN

This application is a Division of application Ser. No. 08/767,426 filed on Dec. 16, 1996, now U.S. Pat. No. 5,942,363.

BACKGROUND OF THE INVENTION

1. Field of the Invention

The present invention relates to an electrophoto-graphic photoconductor comprising an electroconductive support, and a photoconductive layer formed thereon, comprising an aromatic polycarbonate resin as an effective component. In addition, the present invention also relates to the above-mentioned aromatic polycarbonate resin with charge transporting properties.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) is a film-shaped layer comprising a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film is fragile and has a low tensile strength. Such lowering of the mechanical strength of the CTL causes the wearing of the photoconductor or forms scratches and cracks in the surface of the photoconductor.

Although some vinyl polymers such as polyvinyl anthracene, polyvinyl pyrene and poly-N-vinylcarbazole have been studied as high-molecular-weight photoconductive materials for forming a charge transporting complex for use in the conventional organic photo-conductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transporting material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transporting material produces poor results in terms of the photosensitivity and the residual potential although the mechanical strength of the photoconductor is improved.

Conventionally known representative aromatic polycarbonate resins are obtained by allowing 2,2-bis(4-hydroxyphenyl)propane (hereinafter referred to as bisphenol A) to react with a carbonate precursor material such as phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophoto-graphy. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transporting material in the charge transport layer of the layered electrophotographic photoconductor.

SUMMARY OF THE INVENTION

It is therefore a first object of the present invention to provide an electrophotographic photo-conductor free from the conventional shortcomings, which can show high photosensitivity and high durability.

A second object of the present invention is to provide an aromatic polycarbonate resin that is remarkably useful as a high-molecular-weight charge transporting material for use in an organic electrophotographic photoconductor.

The above-mentioned first object of the present invention can be achieved by an electrophotographic photoconductor comprising an electroconductive support, and a photoconductive layer formed thereon comprising as an effective component an aromatic polycarbonate resin having a repeat unit of formula (I):

(I)

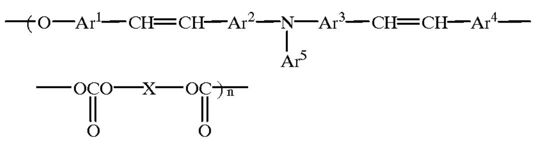

wherein n is an integer of 5 to 5000; $Ar^1$, $Ar^2$, $Ar^3$ and $Ar^4$, which may be the same or different, represent a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; and X is a bivalent aliphatic group, a bivalent cyclic aliphatic group, or

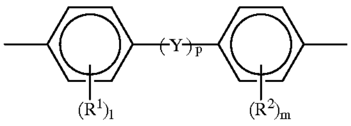

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, —$SO_2$—,

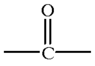
,
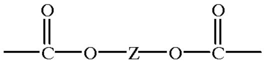
, or

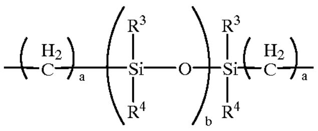

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned photoconductor, the repeat unit of formula (I) may be represented by the following formula (IV):

(IV)

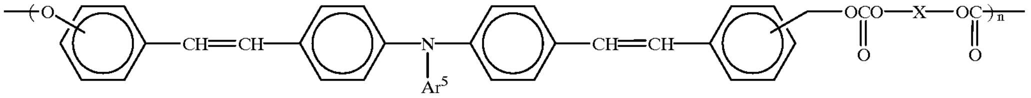

wherein n, $Ar^5$ and X are the same as those previously defined in formula (I).

The first object of the present invention can also be achieved by an electrophotographic photoconductor comprising an electroconductive support, and a photoconductive layer formed thereon comprising as an effective component an aromatic polycarbonate resin having a repeat unit of formula (II) and a repeat unit of formula (III), with the composition ratio of the repeat unit of formula (II) to the repeat unit of formula (III) being in the relationship of $0<k/(k+j)\leq 1$:

(II)

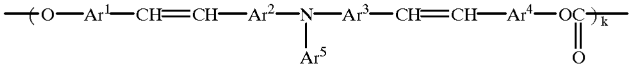

(III)

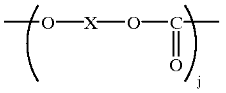

wherein k is an integer of 5 to 5000; j is an integer of 0 to 5000; $Ar^1$, $Ar^2$, $Ar^3$ and $Ar^4$, which may be the same or different, represent a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; and X is a bivalent aliphatic group, a bivalent cyclic aliphatic group, or

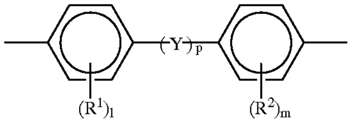

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—,—S—, —S—, —SO—, —$SO_2$—,

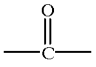
,
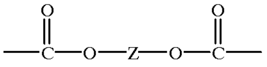
, or

-continued

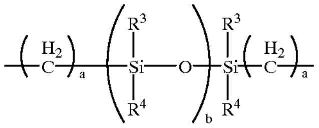

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned photoconductor, the repeat unit of formula (II) may be represented by the following formula (V):

(V)

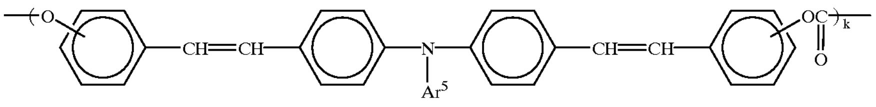

wherein k and $Ar^5$ are the same as those previously defined in formula (II).

The second object of the present invention can be achieved by an aromatic polycarbonate resin having a repeat unit of formula (I):

(I)

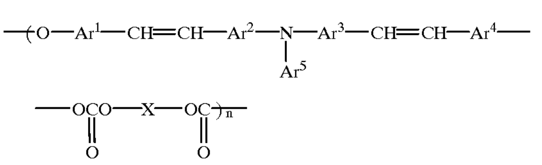

wherein n is an integer of 5 to 5000; $Ar^1$, $Ar_2$, $Ar_3$ and $Ar^4$, which may be the same or different, represent a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; and X is a bivalent aliphatic group, a bivalent cyclic aliphatic group, or

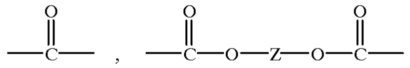

, or

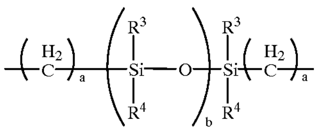

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned aromatic polycarbonate resin, the repeat unit of formula (I) may be represented by the following formula (IV):

(IV)

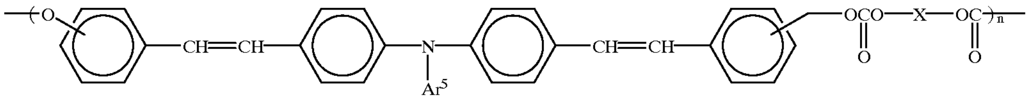

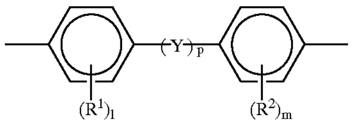

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, $—SO_2—$, wherein n, $Ar^5$ and X are the same as those previously defined in formula (I).

The second object of the present invention can also be achieved by an aromatic polycarbonate resin having a repeat unit of formula (II) and a repeat unit of formula (III), with the composition ratio of the repeat unit of formula (II) to the repeat unit of formula (III) being in the relationship of $0<k/(k+j)\leq 1$:

(II)

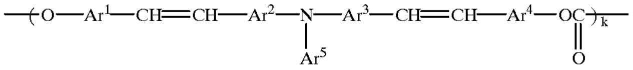

(III)

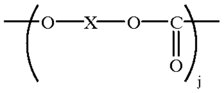

wherein k is an integer of 5 to 5000; j is an integer of 0 to 5000; $Ar^1$, $Ar^2$, $Ar^3$ and $Ar^4$, which may be the same or different, represent a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; and X is a bivalent aliphatic group, a bivalent cyclic aliphatic group, or

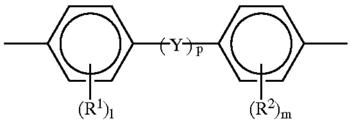

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, —$SO_2$—,

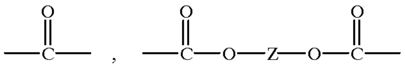

, or

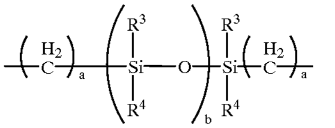

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned aromatic polycarbonate resin, the repeat unit of formula (II) may be represented by the following formula (V):

(V)

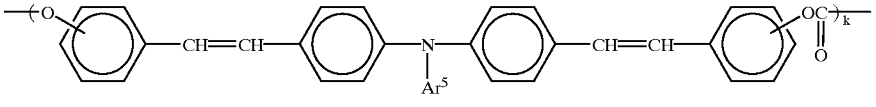

wherein k and $Ar^5$ are the same as those previously defined in formula (II).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
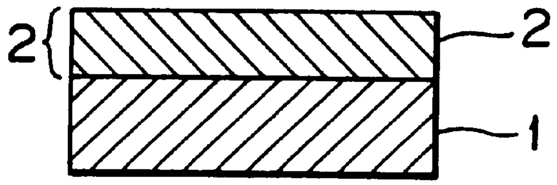
FIG. 1 is a schematic cross-sectional view of a first example of an electrophotographic photoconductor according to the present invention.

The electrophotographic photoconductor according to the present invention comprises a photoconductive layer comprising (i) an aromatic polycarbonate resin having a repeat unit with a triarylamine structure, represented by formula (I) or (IV), or (ii) an aromatic polycarbonate resin having a repeat unit with a triarylamine structure, represented by formula (II) or (V) and a repeat unit of formula (III). Those aromatic polycarbonate resins, which are novel compounds, have charge transporting properties and high mechanical strength, so that the photoconductor of the present invention can exhibit high photosensitivity and excellent durability.

Further, it is preferable that the repeat unit of formula (I) be represented by the following formula (IV):

wherein k and $Ar^5$ are the same as those previously defined in formula (II).

Those aromatic polycarbonate resins according to the present invention can be obtained by the method of synthesizing a conventional polycarbonate resin, that is, polymerization of a bisphenol and a carbonic acid derivative.

To be more specific, the aromatic polycarbonate resin comprising the repeat unit of formula (II) or (V) of the present invention can be produced by the ester interchange between a diol compound having a tertiary amino group represented by the following formula (VI) or (VII) and a (IV)

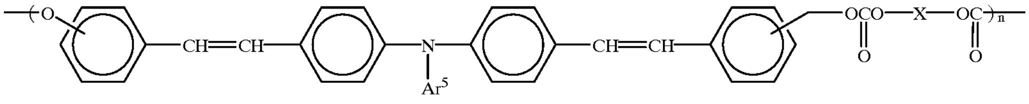

wherein n, $Ar^5$ and X are the same as those previously defined in formula (I).

In addition, it is preferable that the repeat unit of formula (II) be represented by the following formula (V):

bisarylcarbonate compound, or by the polymerization of the diol compound of formula (VI) or (VII) with phosgene in accordance with solution polymerization or interfacial polymerization:

(V)

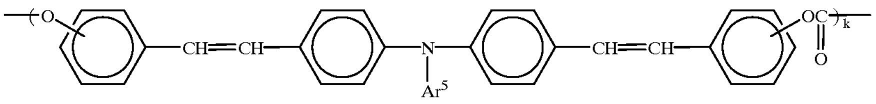

(VI)

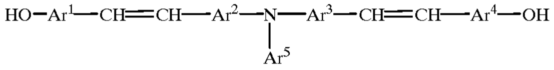

(VII)

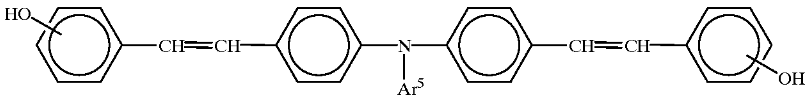

wherein $Ar^1$ to $Ar^5$ are the same as those previously defined in formula (I).

When a diol compound of the following formula (VIII) is employed in combination with the diol compound of formula (VI) or (VII) in the course of the polymerization with the phosgene, there can be obtained the aromatic polycarbonate resin of the present invention comprising the repeat unit of formula (II) having a tertiary amino group and the repeat unit of formula (III), or the aromatic polycarbonate resin of the present invention comprising the repeat unit of formula (V) having a tertiary amino group and the repeat unit of formula (III):

$$OH—X—OH \qquad (VIII)$$

wherein X is the same as that previously defined in formula (I).

By such a synthesis method, the aromatic polycarbonate resin provided with the desired characteristics can be obtained. Further, the composition ratio of the repeat unit of formula (II) to the repeat unit of formula (III), or that of the repeat unit of formula (V) to the repeat unit of formula (III) can be selected within a wide range in light of the desired characteristics of the obtained aromatic polycarbonate resin.

The aromatic polycarbonate resin of the present invention comprising the repeat unit of formula (I) or (IV) having a tertiary amino group can be obtained by polymerizing the diol compound having a tertiary amino group, represented by formula (VI) or (VII), with a bischloroformate compound derived from the diol compound of formula (VIII) in accordance with solution polymerization or interfacial polymerization. Alternatively, the above-mentioned aromatic polycarbonate resin can also be obtained by polymerizing a bischloroformate compound derived from the diol compound having a tertiary amino group, represented by formula (VI) or (VII), with the diol compound of formula (VIII).

According to the ester interchange method, a diol compound and a bisarylcarbonate compound are mixed in the presence of an inert gas, and the polymerization reaction is generally carried out at temperature in the range of 120 to 350° C. under reduced pressure. The pressure in the reaction system is stepwise reduced to 1 mmHg or less in order to distill away the phenols generated during the reaction from the reaction system. The reaction is commonly terminated in about one to 4 hours. When necessary, a molecular weight modifier and an antioxidant may be added to the reaction system. As the bisarylcarbonate compound, diphenyl carbonate, di-p-tolyl carbonate, phenyl-p-tolyl carbonate, di-p-chlorophenyl carbonate and dinaphthyl carbonate can be employed.

solvents such as dichloromethane and chlorobenzene can be employed. In addition, a catalyst such as tertiary amine or a quaternary ammonium salt may be used to accelerate the reaction speed. Furthermore, it is also desirable to use phenol or p-tert-butylphenol as a molecular weight modifier. The polymerization reaction is generally carried out at temperature in the range of 0 to 40° C. In this case, the polymerization is terminated in several minutes to 5 hours. It is desirable to maintain the reaction system to pH 10 or more.

In the case of the polymerization of a diol compound with a bischloroformate compound, the diol compound is dissolved in a proper solvent to prepare a solution of the diol compound, and a deacidifying agent and the bischloroformate compound are added to the above prepared diol solution. In this case, tertiary amine compounds such as trimethylamine, triethylamine and tripropylamine, and pyridine can be used as the deacidifying agents. Examples of the solvent for use in the above-mentioned polymerization reaction are halogenated hydrocarbon solvents such as dichloromethane, dichloroethane, trichloroethane, tetrachloroethane, trichloroethylene, and chloroform; and cyclic ethers such as tetrahydrofuran and dioxane. In addition, it is desirable to use phenol or p-tert-butylphenol as a molecular weight modifier. The reaction temperature is generally in the range of 0 to 40° C. In this case, the polymerization is generally terminated in several minutes to 5 hours.

To the aromatic polycarbonate resin produced by the previously mentioned methods, various additives such as an antioxidant, a light stabilizer, a thermal stabilizer, a lubricant and a plasticizer can be added when necessary.

As previously mentioned, the aromatic polycarbonate resin according to the present invention is a homopolymer comprising a repeat unit of (II) or (V), an alternating copolymer comprising the repeat unit of formula (I) or (IV), or a random copolymer or block copolymer comprising the repeat unit of (II) or (V) and the repeat unit of (III).

It is preferable that the aromatic polycarbonate resin according to the present invention thus obtained have a number-average molecular weight of 1,000 to 1,000,000, more preferably in the range of 5,000 to 500,000 when expressed by the styrene-reduced value.

The diol compound having a tertiary amine group represented by the formula (VI) or (VII), which is an intermediate for preparation of the aromatic polycarbonate resin according to the present invention, will now be explained in detail.

In the present invention, there can be employed a hydroxyl-group-containing stilbene compound represented by the following formula (IX) or (X), which is a novel compound, as the diol compound having a tertiary amine group:

(IX)

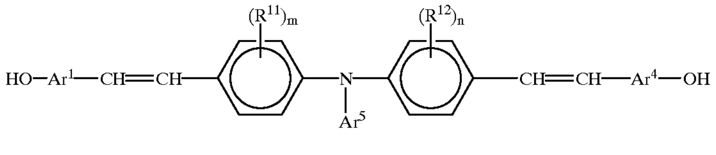

The polymerization of a diol compound with the phosgene is commonly carried out in the presence of an agent for deacidifying and a solvent. In this case, hydroxides of alkali metals such as sodium hydroxide and potassium hydroxide, and pyridine can be used as the deacidifying agents in the above reaction. As the solvent, halogenated hydrocarbon wherein $Ar^1$ and $Ar^4$, which may be the same or different, are each independently a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; $R^{11}$ and $R^{12}$ are each independently an alkyl group which may have a substituent, a halogen atom, or an aromatic hydrocarbon group which may have a substituent; and m and n are each independently an integer of 0 to 4.

(X)

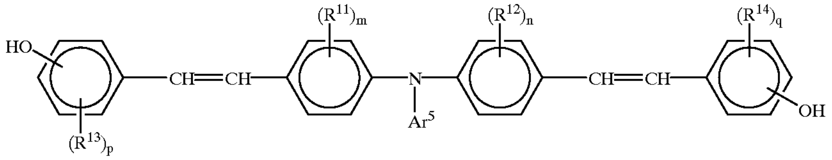

wherein $Ar^5$, $R^{11}$, $R^{12}$, m and n are the same as those as previously defined in formula (IX); $R^{13}$ and $R^{14}$ are each independently an alkyl group which may have a substituent, a halogen atom, or an aromatic hydrocarbon group which may have a substituent; and p and q are each independently an integer of 0 to 4.

Namely, such a hydroxyl-group-containing stilbene compound can be used as an intermediate for preparation of the aromatic polycarbonate resin according to the present invention.

In the formulae (IX) and (X), examples of the aromatic hydrocarbon group represented by $Ar^5$ are phenyl group, biphenylyl group, terphenylyl group, naphthyl group, anthryl group, pyrenyl group, fluorenyl group, 9,9-dimethyl-2-fluorenyl group, azulenyl group, triphenylenyl group, chrysenyl group, and a group of the following formula (XI):

(XI)

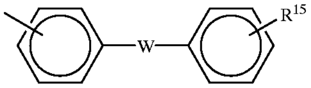

wherein $R^{15}$ is a hydrogen atom, an alkyl group which may have a substituent, an alkoxyl group, a halogen atom, an aromatic hydrocarbon group which may have a substituent, nitro group, cyano group or a substituted amino group; and W is selected from the group consisting of —O—, —S—, —SO—, —$SO_2$—, —CO—and the following bivalent groups:

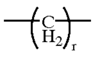
, and
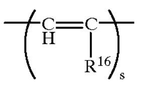

in which $R^{16}$ is a hydrogen atom, an alkyl group which may have a substituent, or an aromatic hydrocarbon group which may have a substituent; and r and s are each independently an integer of 1 to 12.

In the case where $R^{15}$ and $R^{16}$ represent an aromatic hydrocarbon group which may have a substituent, the same aromatic hydrocarbon groups as mentioned in the definition of $Ar^5$ are usable.

In the case where $R^{15}$ and $R^{16}$ represent an alkyl group which may have a substituent, there can be employed a straight-chain or branched alkyl group having 1 to 5 carbon atoms. The above alkyl group may have a substituent such as a fluorine atom, cyano group, or a phenyl group which may have a substituent selected from the group consisting of a halogen atom and an alkyl group having 1 to 5 carbon atoms.

Specific examples of the above alkyl group include methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, and 4-methylbenzyl group.

In the case where $R^{15}$ represents a substituted amino group, there can be employed a group of:

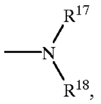

in which $R^{17}$ and $R^{18}$ are each independently an alkyl group which may have a substituent, an aromatic hydrocarbon group which may have a substituent or a heterocyclic group.

Examples of the heterocyclic group represented by $Ar^5$ are thienyl group, benzothienyl group, furyl group, benzofuranyl group and carbazolyl group.

With respect to the bivalent aromatic hydrocarbon group and the bivalent heterocyclic group represented by $Ar^1$ and $Ar^4$ in formula (IX), there can be employed the bivalent groups derived from the above-mentioned aromatic hydrocarbon groups and heterocyclic groups.

Examples of the substituent for $Ar^1$, $Ar^4$ and $Ar^5$, and examples of $R^{11}$ to $R^{14}$ in formula (X) include a halogen atom, an aromatic hydrocarbon group, and an alkyl group. In this case, the same aromatic hydrocarbon groups and alkyl groups as previously mentioned can be employed. In addition, there can be employed a fluorine atom, chlorine atom, bromine atom, and iodine atom as the halogen atom.

The hydroxyl-group-containing stilbene compound of formula (IX) or (X) can be synthesized by the conventional method.

In the case where hydroxyl groups are substituted for two hydrogen atoms at the same position in a hydroxyl-group-containing stilbene compound of formula (X) to form a symmetrical structure, the synthesis of such a stilbene compound is carried out, for example, in accordance with the following reaction schemes:

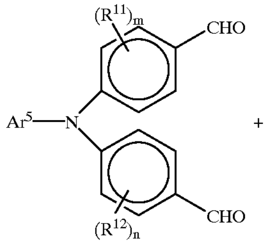

(XII)

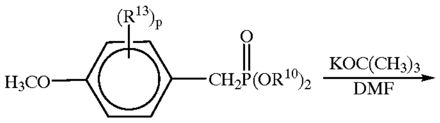

(XIII)

-continued

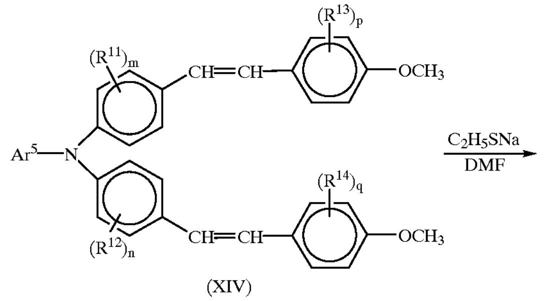

(XIV)

(XV)

wherein $Ar^5$, $R^{11}$ to $R^{14}$, m, n, p, and q are the same as those previously defined in formula (IX) and (X); and $R^{10}$ is a lower alkyl group.

On the other hand, when a hydroxyl-group-containing stilbene compound is unsymmetrical, with hydroxyl groups being substituted for two hydrogen atoms at different positions, the synthesis is carried out, for example, in accordance with the following reaction schemes:

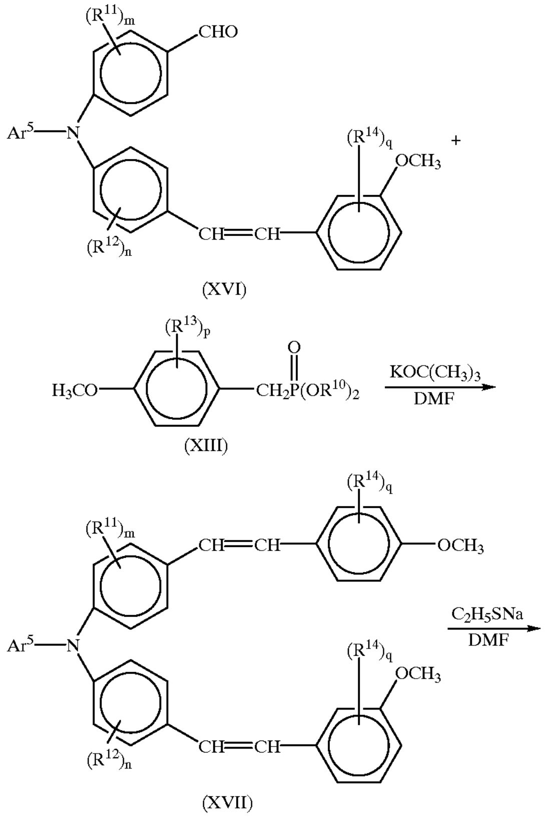

(XVI)

(XIII)

(XVII)

-continued

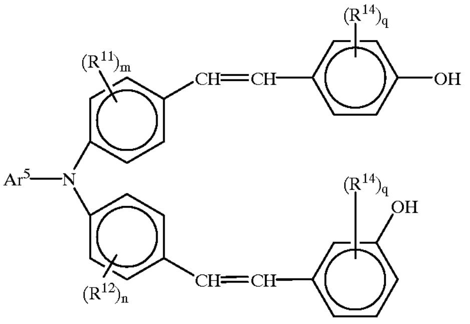

(XVIII)

wherein $Ar^5$, $R^{11}$ to $R^{14}$, m, n, p, and q are the same as those previously defined in formula (IX) and (X); and $R^{10}$ is a lower alkyl group.

In the above-mentioned reaction schemes, the compound of formula (XIV) or (XVII) can be obtained by allowing a corresponding formyl compound represented by formula (XII) or (XVI) to react with a corresponding phosphonate compound of formula (XIII) by the modified Wittig reaction in the presence of a basic catalyst.

In this case, potassium-t-butoxide, sodium hydroxide, potassium hydroxide, sodium amide, and sodium methylate can be used as the basic catalysts.

Examples of the reaction solvent used in the above-mentioned reaction are methanol, ethanol, isopropanol, butanol, 2-methoxyethanol, 1,2-dimethoxyethane, bis(2-methoxyethyl)ether, dioxane, tetrahydrofuran, toluene, xylene, dimethyl sulfoxide, N,N-dimethylformamide, N-methylpyrrolidone and 1,3-dimethyl-2-imidazolidinone. Of these solvents, a polar solvent such as N,N-dimethylformamide or dimethyl sulfoxide is preferably employed.

The reaction temperature in the above-mentioned modified Wittig reaction may be determined within a wide range depending on (1) the stability of the employed solvent with respect to the employed basic catalyst, (2) the reactivity of the condensed components, and (3) the reactivity of the employed basic catalyst as a condensation agent in the solvent. For instance, when a polar solvent is employed, the reaction temperature is in the range of room temperature to 100° C., preferably in the range of room temperature to 80° C. The reaction temperature may be further increased when it is desired to curtail the reaction time, or the activity of a condensation agent to be employed is low.

Thereafter, to obtain the compound of formula (XV) or (XVIII) in the above-mentioned reaction schemes, cleavage of the ether linkage of the alkoxyl group in the stilbene compound of formula (XIV) or (XVII) is carried out.

The cleavage of the ether linkage of the alkoxyl group in the stilbene compound can be carried out using an acidic reagent or basic reagent.

Specific examples of the acidic reagent used in the cleavage of the ether linkage are hydrogen bromide, hydrogen iodide, trifluoroacetic acid, hydrochloride of pyridine, concentrated hydrochloric acid, magnesium iodide ethylate, aluminum chloride, aluminum bromide, boron tribromide, boron trichloride, and boron triiodide.

Specific examples of the basic reagent are sodium thioethoxide, sodium thiomethoxide, potassium hydroxide, sodium hydroxide, sodium, lithium, sodium iodide, lithium iodide, and lithium diphenyl phosphide.

For the above-mentioned cleavage of the ether linkage, a solvent such as acetic anhydride, dichloromethane, tetrahydrofuran (THF), N,N-dimethylformamide (DMF), pyridine or butanol can be employed. The reaction temperature, which varies depending on the activity of the employed reagent, is generally in the range of room temperature to 200° C.

The phosphonate compound of formula (XIII) can be readily produced by allowing a corresponding halogen compound to react with trialkyl phosphite under the application of heat thereto without any solvent, or in an organic solvent such as toluene, xylene or N,N-dimethylformamide.

A variety of materials such as a polycarbonate resin, polyester resin, polyurethane resin and epoxy resin can be obtained by deriving from the hydroxyl group of the above-mentioned hydroxyl-group-containing stilbene compound. In other words, the hydroxyl-group-containing stilbene compound for use in the present invention is considered to be useful as an intermediate for the preparation of those materials. In particular, an organic polymer such as a polycarbonate resin prepared from the above-mentioned hydroxyl-group-containing stilbene compound is useful as the organic photoconductive material.

The thus obtained polycarbonate resin according to the present invention will now be explained in detail.

In the repeat units of the aromatic polycarbonate resins, represented by formulae (I), (II), (IV) and (V), and the diol compounds represented by formulae (VI) and (VII), $Ar^5$ is an aromatic hydrocarbon group or a heterocyclic group, as previously mentioned. There can be employed the same aromatic hydrocarbon groups and heterocyclic groups as mentioned in the definition of $Ar^5$ of the hydroxyl-group-containing stilbene compounds of formulae (IX) and (X).

The bivalent aromatic hydrocarbon group represented by $Ar^1$, $Ar^2$, $Ar^3$ and $Ar^4$ is a bivalent group derived from one aromatic hydrocarbon group selected from the group consisting of benzene, naphthalene, biphenyl terphenyl, pyrene, fluorene, and 9,9-dimethylfluorene.

The bivalent heterocyclic group represented by $Ar^1$, $Ar^2$, $Ar^3$ and $Ar^4$ is a bivalent group derived from one heterocyclic group selected from the group consisting of thiophene, benzothiophene, furan, benzofuran and carbazole. Further, for the bivalent heterocyclic group represented by $Ar^1$, $Ar^2$, $Ar^3$ and $Ar^4$, there can be employed diphenyl ether group in which two aryl groups are bonded via oxygen, or diphenyl thioether group in which two aryl groups are bonded via sulfur.

The above-mentioned aromatic hydrocarbon group and heterocyclic group represented by $Ar^5$ and the above-mentioned bivalent aromatic hydrocarbon group and bivalent heterocyclic group represented by $Ar^1$ to $Ar^4$ may have a substituent.

Examples of such a substituent for $Ar^1$ to $Ar^5$ are as follows:

(1) A halogen atom, cyano group, and nitro group.

(2) An alkyl group, preferably a straight chain or branched alkyl group having 1 to 12 carbon atoms, more preferably having 1 to 8 carbon atoms, further preferably having 1 to 4 carbon atoms. The alkyl group may have a substituent such as a fluorine atom, hydroxyl group, cyano group, an alkoxyl group having 1 to 4 carbon atoms, or a phenyl group which may have a substituent selected from the group consisting of a halogen atom, an alkyl group having 1 to 4 carbon atoms, and an alkoxyl group having 1 to 4 carbon atoms.

Specific examples of such an alkyl group are methyl group, ethyl group, n-propyl group, i-propyl group, t-butyl group, s-butyl group, n-butyl group, i-butyl group, trifluoromethyl group, 2-hydroxyethyl group, 2-cyanoethyl group, 2-ethoxyethyl group, 2-methoxyethyl group, benzyl group, 4-chlorobenzyl group, 4-methylbenzyl group, and 4-methoxybenzyl group.

(3) An alkoxyl group ($—OR^5$) in which $R^5$ is the same alkyl group as previously defined in (2).

Specific examples of such an alkoxyl group are methoxy group, ethoxy group, n-propoxy group, i-propoxy group, t-butoxy group, n-butoxy group, s-butoxy group, i-butoxy group, 2-hydroxyethoxy group, 2-cyanoethoxy group, benzyloxy group, 4-methylbenzyloxy group, and trifluoromethoxy group.

(4) An aryloxy group. Examples of the aryl group for use in the aryloxy group are phenyl group and naphthyl group. The aryloxy group may have a substituent such as an alkoxyl group having 1 to 4 carbon atoms, an alkyl group having 1 to 4 carbon atoms, or a halogen atom.

Specific examples of the aryloxy group are phenoxy group, 1-naphthyloxy group, 2-naphthyloxy group, 4-methylphenoxy group, 4-methoxyphenoxy group, 4-chlorophenoxy group, and 6-methyl-2-naphthyloxy group.

(5) A substituted mercapto group or an arylmercapto group. Specific examples of the substituted mercapto group and arylmercapto group include methylthio group, ethylthio group, phenylthio group, and p-methylphenylthio group.

(6) A substituted amino group of:

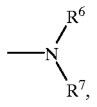

in which $R^6$ and $R^7$ are each independently the same alkyl group as defined in (2), or an aryl group such as phenyl group, biphenylyl group or naphthyl group.

The above-mentioned aryl group may have a substituent such as an alkoxyl group having 1 to 4 carbon atoms, an alkyl group having 1 to 4 carbon atoms or a halogen atom. In addition, $R^6$ and $R^7$ may form a ring in combination with each other, or in combination with a carbon atom of the aryl group.

Specific examples of the group (6) are diethylamino group, N-methyl-N-phenylamino group, N,N-diphenylamino group, N,N-di(p-tolyl)amino group, dibenzylamino group, piperidino group, morpholino group and julolidyl group.

(7) An alkylenedioxy group such as methylenedioxy group, or an alkylenedithio group such as methylenedithio group.

(8) An acyl group such as acetyl group, propionyl group, butyryl group, malonyl group, or benzoyl group.

When $R^1$ to $R^4$ in formula (I) or (II) represent an alkyl group which may have a substituent, the same alkyl groups as previously mentioned in the definition (2) can be employed. When $R^1$ to $R^4$ represent an aromatic hydrocarbon group which may have a substituent, there can be employed a substituted or unsubstituted phenyl group, or a substituted or unsubstituted biphenylyl group.

Examples of the diol compound represented by formula (VIII) include aliphatic diols such as 1,3-propanediol, 1,4-butanediol, 1,5-pentanediol, 1,6-hexanediol, 1,8-octanediol, 1,10-decanediol, 2-methyl-1,3-propanediol, 2,2-dimethyl-1,3-propanediol, 2-ethyl-1,3-propanediol, diethylene glycol, triethylene glycol, polyethylene glycol and polytetramethylene ether glycol; and cyclic aliphatic diols such as 1,4-cyclohexanediol, 1,3-cyclohexanediol and cyclohexane-1,4-dimethanol.

Examples of the diol having an aromatic ring are as follows: 4,4'-dihydroxydiphenyl, bis(4-hydroxyphenyl)- methane, 1,1-bis(4-hydroxyphenyl)ethane, 1,1-bis(4-hydroxyphenyl)-1-phenylethane, 2,2-bis(4-hydroxyphenyl)-propane, 2,2-bis(3-methyl-4-hydroxyphenyl)propane, 1,1-bis(4-hydroxyphenyl)cyclohexane, 1,1-bis(4-hydroxy-phenyl)cyclopentane, 2,2-bis(3-phenyl-4-hydroxyphenyl)-propane, 2,2-bis(3-isopropyl-4-hydroxyphenyl)propane, 2,2-bis(4-hydroxyphenyl)butane, 2,2-bis(3,5-dimethyl-4-hydroxyphenyl)propane, 2,2-bis(3,5-dibromo-4-hydroxyphenyl)propane, 4,4'-dihydroxydiphenylsulfone, 4,4'-dihydroxydiphenylsulfoxide, 4,4'-dihydroxy-diphenylsulfide, 3,3'-dimethyl-4,4'-dihydroxydiphenyl-sulfide, 4,4'-dihydroxydiphenyloxide, 2,2-bis(4-hydroxyphenyl)hexafluoropropane, 9,9-bis(4-hydroxy-phenyl)fluorene, 9,9-bis(4-hydroxyphenyl)xanthene, ethylene glycol-bis(4-hydroxybenzoate), diethylene glycol-bis(4-hydroxybenzoate), triethylene glycol-bis(4-hydroxybenzoate), 1,3-bis(4-hydroxyphenyl)-tetramethyl disiloxane, and phenol-modified silicone oil.

In the photoconductors according to the present invention, at least one of the previously mentioned aromatic polycarbonate resins is contained in the photoconductive layers 2, 2*a*, 2*b*, 2*c*, 2*d*, and 2*e*. The aromatic polycarbonate resin can be employed in different ways, for example, as shown in FIGS. 1 through 6.

In the photoconductor as shown in FIG. 1, a photoconductive layer 2 is formed on an electroconductive support 1, which photoconductive layer 2 comprises an aromatic polycarbonate resin of the present invention and a sensitizing dye, with the addition thereto of a binder agent (binder resin) when necessary. In this photoconductor, the aromatic polycarbonate resin works as a photoconductive material, through which charge carriers which are necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Figure 2:
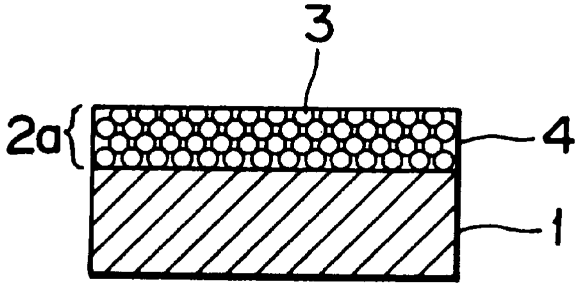
FIG. 2 is a schematic cross-sectional view of a second example of an electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2*a* on an electroconductive support 1. The photoconductive layer 2*a* comprises a charge transport medium 4 comprising (i) an aromatic polycarbonate resin of the present invention, optionally in combination with a binder agent, and (ii) a charge generation material 3 dispersed in the charge transport medium 4. In this embodiment, the aromatic polycarbonate resin (or a mixture of the aromatic polycarbonate resin and the binder agent) constitutes the charge transport medium 4. The charge generation material 3, which is, for example, an inorganic material or an organic pigment, generates charge carriers. The charge transport medium 4 accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4 and reach the surface of the charge generation material 3. Since the aromatic polycarbonate resin comprising the repeat unit of formula (I) do not substantially absorb light in the visible range, it can work effectively as a charge transport material when used with the charge generation material 3 which absorbs the light in the visible region and generates charge carriers. The charge transport medium 4 may further comprise a low-molecular weight charge transport material in combination.

Figure 3:
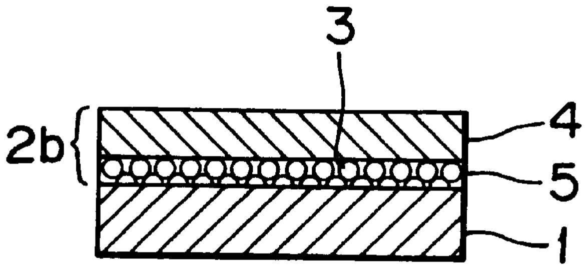
FIG. 3 is a schematic cross-sectional view of a third example of an electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2*b* comprising a charge generation layer 5 containing the charge generation material 3, and a charge transport layer 4 comprising an aromatic polycarbonate resin of the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. Furthermore, in order to increase the efficiency of generating the charge carriers, the charge generation layer 5 may further comprise the aromatic polycarbonate resin of the present invention, and the photoconductive layer 2*b* including the charge generation layer 5 and the charge transport layer 4 may further comprise a low-molecular weight charge transport material. This can be applied to the embodiments of FIGS. 4 to 6 to be described later.

Figure 4:
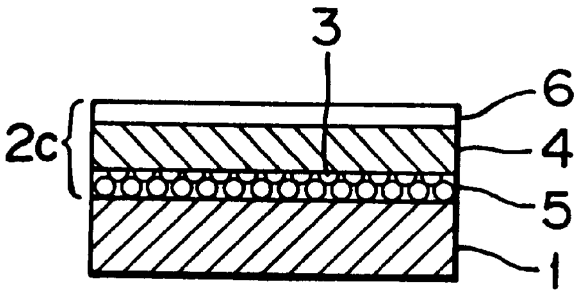
FIG. 4 is a schematic cross-sectional view of a fourth example of an electrophotographic photoconductor according to the present invention.

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. In such a case, it is effective that the protective layer 6 be provided on a charge transport layer in which a low-molecular weight charge transport material is dispersed. The protective layer 6 may be provided on the photoconductive layer 2*a* of the photoconductor as shown in FIG. 2.

Figure 5:
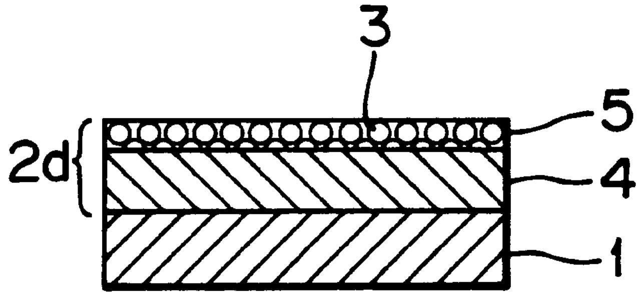
FIG. 5 is a schematic cross-sectional view of a fifth example of an electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

Figure 6:
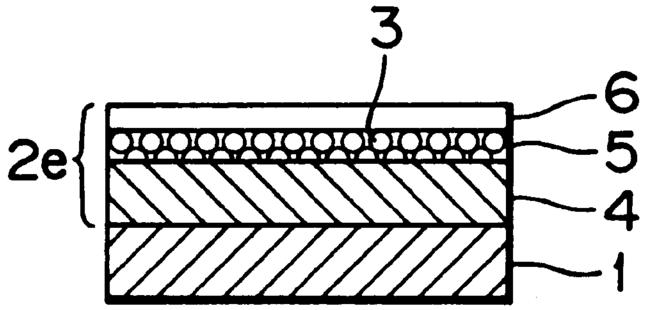
FIG. 6 is a schematic cross-sectional view of a sixth example of an electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is prepared, at least one aromatic polycarbonate resin of the present invention is dissolved in a solvent, with the addition thereto of a binder agent when necessary. To the thus prepared solution, a sensitizing dye is added, so that a photoconductive layer coating liquid is prepared. The thus prepared photoconductive layer coating liquid is coated on an electroconductive support 1 and dried, so that a photoconductive layer 2 is formed on the electroconductive support 1.

It is preferable that the thickness of the photo-conductive layer 2 be in the range of 3 to 50 μm, more preferably in the range of 5 to 20 μm. It is preferable that the amount of the aromatic polycarbonate resin of the present invention be in the range of 30 to 100 wt. % of the total weight of the photoconductive layer 2.

It is preferable that the amount of the sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be obtained by the following method:

The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for the photoconductive layer 2*a* is prepared. The coating liquid thus prepared is coated on the electroconductive support 1 and then dried, whereby the photoconductive layer 2*a* is provided on the electroconductive support 1.

It is preferable that the thickness of the photo-conductive layer 2*a* be in the range of 3 to 50 μm, more preferably in the range of 5 to 20 μm. It is preferable that the amount of the aromatic polycarbonate resin for use in the photoconductive layer 2*a* be in the range of 40 to 100 wt. % of the total weight of the photoconductive layer 2*a*.

It is preferable that the amount of the charge generation material 3 for use in the photoconductive layer 2*a* be in the range of 0.1 to 50 wt. %, more preferably in the range of 1 to 20 wt. % of the total weight of the photoconductive layer 2*a*.

Specific examples of the charge generation material 3 for use in the present invention are as follows: inorganic materials such as selenium, selenium—tellurium, cadmium sulfide, cadmium sulfide—selenium and α-silicone; and organic pigments such as an azo pigment, for example, C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); a phthalocyanine pigment such as C.I. Pigment Blue 16 (C.I. 74100); an indigo pigment such as C.I. Vat Brown 5 (C.I. 73410) and C.I. Vat Dye (C.I. 73030); and a perylene pigment such as Algol Scarlet B and Indanthrene Scarlet R (made by Bayer Co., Ltd.). These charge generation materials may be used alone or in combination.

The electrophotographic photoconductor shown in FIG. 3 can be obtained by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin of the present invention, optionally in combination with a binder agent is dissolved is coated and dried, so that the charge transport layer 4 is formed on the charge generation layer 5. In the charge generation layer 5, the same charge generation materials as employed in the above-mentioned photoconductive layer 2*a* can be used.

The thickness of the charge generation layer 5 is 5 μm or less, preferably 2 μm or less. It is preferable that the thickness of the charge transport layer 4 be in the range of 3 to 50 μm, more preferably in the range of 5 to 20 μm.

When the charge generation layer 5 is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of the aromatic polycarbonate resin of the present invention for use in the charge transport layer 4 be in the range of 40 to 100 wt. % of the total weight of the charge transport layer 4.

The photoconductive layer 2*b* of the photoconductor shown in FIG. 3 may comprise a low-molecular-weight charge transporting material as previously mentioned.

Examples of the low-molecular-weight charge transport material for use in the present invention are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51–94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To prepare the photoconductor shown in FIG. 4, a coating liquid for the protective layer 6 is prepared by dissolving the aromatic polycarbonate resin of the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. It is preferable that the amount of the aromatic polycarbonate resin of the present invention for use in the protective layer 6 be in the range of 40 to 100 wt. % of the total weight of the protective layer 6.

The electrophotographic photoconductor shown in FIG. 5 can be obtained by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 1, a coating liquid prepared by dispersing the finely-divided particles of the charge generation material 3 in a solvent in which the binder agent may be dissolved when necessary, is coated by spray coating and dried, so that the charge generation layer 5 is provided on the charge transport layer 4. The amount ratios of the components contained in the charge generation layer 5 and charge transport layer 4 are the same as those previously described in FIG. 3.

The electrophotographic photoconductor shown in FIG. 6 can be fabricated by forming a protective layer 6 on the charge generation layer 5 of the photoconductor shown in FIG. 5.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins having insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agents when necessary.

Furthermore, in the electrophotographic photo-conductor according to the present invention, an inter-mediate layer such as an adhesive layer or a barrier layer may be interposed between the electroconductive support and the photoconductive layer when necessary. Examples of the material for use in the intermediate layer are polyamide, nitrocellulose and aluminum oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, which are given for illustration of the invention and are not intended to be limiting thereof.

Preparation Example 1

[Preparation of N,N-bis[4-(3-methoxystyryl) phenyl]-N-(4-methylphenyl)amine]

25.24 g (80 mmol) of bis(4-formylphenyl)-4-methylphenylamine and 53.74 g (208 mmol) of diethyl[(3-methoxyphenyl)methyl]phosphonate were dissolved in 250 ml of dry DMF.

To the above prepared solution, 26.95 g (240 mmol) of potassium tert-butoxide was added dropwise with stirring to carry out the reaction.

After stirring for 3 hours at room temperature, the reaction mixture was diluted with water, neutralized with acetic acid, and then extracted with ethyl acetate. Then, the resultant ethyl acetate layer was washed with water, dried over anhydrous magnesium sulfate, and then filtered off, thereby obtaining a crude product.

The crude product thus obtained was chromatographed on a silica gel column using a developing solvent consisting of toluene and hexane at a mixing ratio of 2:1. An oily material thus obtained was washed with methanol, whereby 30.56 g of N,N-bis[4-(3-methoxystyryl)phenyl]-N-(4-methylphenyl)amine represented by the following formula (1) was obtained in a yield of 72.9%. The above-mentioned compound was light yellow powder with a melting initiation temperature of 105.5° C.

(1)

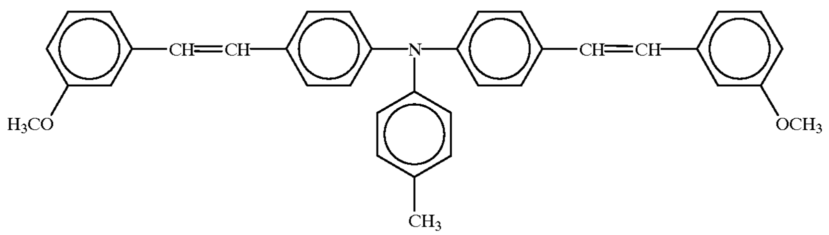

The results of the elemental analysis of this product are as follows:

| | % C | % H | % N |
|---|---|---|---|
| Found | 85.10 | 6.37 | 2.70 |
| Calcd. | 84.86 | 6.35 | 2.67 |

Figure 22:
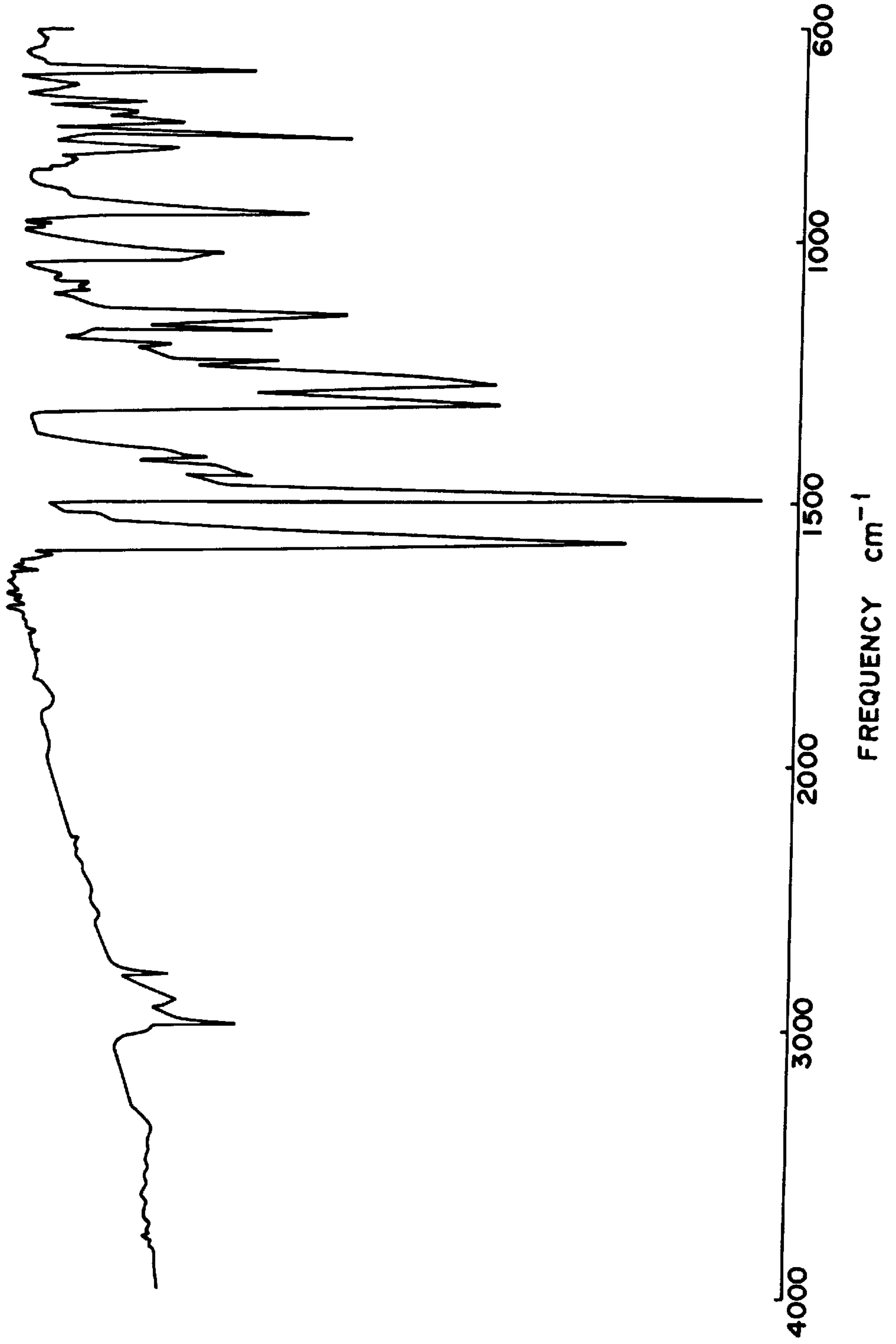
FIG. 22 is an IR spectrum of N,N-bis[4-(3-methoxystyryl) phenyl]-N-(4-methylphenyl)amine obtained in Preparation Example 1, that is, an intermediate for a hydroxyl-group-containing stilbene compound No. 1 obtained in Preparation Example 4, taken by use of a KBr tablet.

An infrared spectrum of this compound of formula (1), taken by use of a KBr tablet, is shown in FIG. 22.

Preparation Example 2

[Preparation of N,N-bis[4-(4-methoxystyryl) phenyl]-N-(4-methylphenyl)amine]

25.52 g (81 mmol) of bis(4-formylphenyl)-4-methylphenylamine and 54.40 g (210 mmol) of diethyl[(4-methoxyphenyl)methyl]phosphonate were dissolved in 250 ml of dry DMF.

To the above prepared solution, 26.27 g (243 mmol) of potassium tert-butoxide was added dropwise with stirring to carry out the reaction.

After stirring for 5 hours at room temperature, 31.35 g (121 mmol) of diethyl[(4-methoxyphenyl)methyl] phosphonate and 13.62 g (121 mmol) of potassium tert-butoxide were added to the reaction mixture, and the obtained mixture was further stirred for 4 hours. After the reaction mixture was diluted with water, it was neutralized with acetic acid, and washed with water. Then, a crude product was obtained from the reaction mixture by filtration.

The crude product thus obtained was chromatographed on a silica gel column using toluene as a developing solvent. A material thus obtained was washed with methanol, and recrystallized from 2400 ml of 2-butanone, whereby 27.64 g of N,N-bis[4-(4-methoxystyryl)phenyl]-N-(4-methylphenyl)amine represented by the following formula (2) was obtained in a yield of 65%. The above-mentioned compound was light yellow powder with a melting point of 226.0 to 228.6° C.

The results of the elemental analysis of this product are as follows:

Elemental analysis:

| | % C | % H | % N |
|---|---|---|---|
| Found | 85.05 | 6.32 | 2.62 |
| Calcd. | 84.86 | 6.35 | 2.67 |

Figure 23:
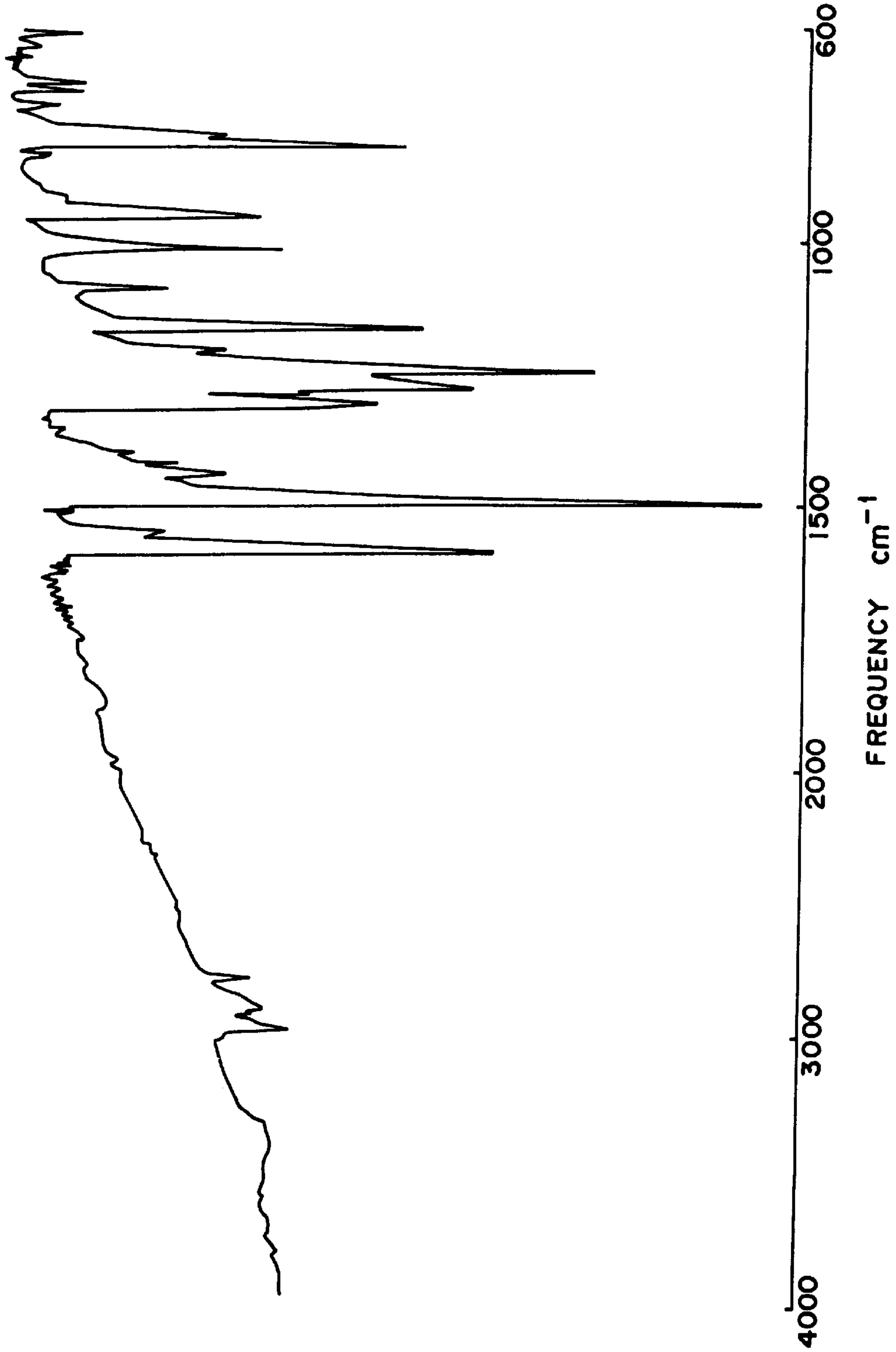
FIG. 23 is an IR spectrum of N,N-bis[4-(4-methoxystyryl) phenyl]-N-(4-methylphenyl)amine obtained in Preparation Example 2, that is, an intermediate for a hydroxyl-group-containing stilbene compound No. 2 obtained in Preparation Example 5, taken by use of a KBr tablet.

An infrared spectrum of this compound of formula (2), taken by use of a KBr tablet, is shown in FIG. 23.

Preparation Example 3

[Preparation of N-[4-(4-methoxystyryl)phenyl]-N-[4-(3-methoxystyryl)phenyl]-N-(4-methylphenyl) amine]

25.18 g (60 mmol) of N-[4-(3-methoxystyryl)phenyl]-N-(4-formylphenyl)-N-(4-methylphenyl)amine and 20.15 g (78 mmol) of diethyl[(4-methoxyphenyl)methyl] phosphonate were dissolved in 160 ml of dry DMF.

To the above prepared solution, 10.10 g (90 mmol) of potassium tert-butoxide was added dropwise with stirring to carry out the reaction.

After stirring for 4 hours at room temperature, the reaction mixture was diluted with water, neutralized with acetic acid, and then extracted with ethyl acetate. Then, the resultant ethyl acetate layer was washed with water, dried over anhydrous magnesium sulfate, and then filtered off, thereby obtaining a crude product.

The crude product thus obtained was chromatographed on a silica gel column using a developing solvent consisting of toluene and hexane at a mixing ratio of 4:1. A material thus obtained was washed with methanol, and recrystallized from a mixed solvent of toluene and ethanol, whereby 23.11 g of N-[4-(4-methoxystyryl)-phenyl]-N-[4-(3-methoxystyryl) phenyl]-N-(4-methylphenyl)amine represented by the following formula (3) was obtained in a yield of 73.5%. The above-mentioned compound was light yellow powder with a melting point of 120.0 to 123.0° C.

(2)

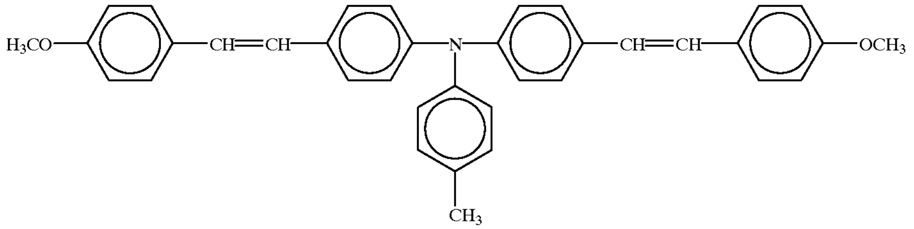

(3)

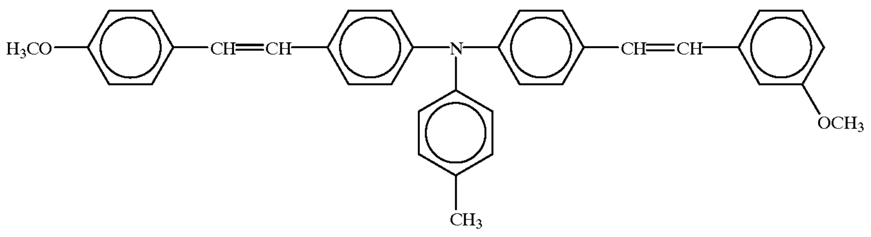

The results of the elemental analysis of this product are as follows:

Elemental analysis:

| | % C | % H | % N |
|---|---|---|---|
| Found | 84.97 | 6.39 | 2.64 |
| Calcd. | 84.86 | 6.35 | 2.67 |

Figure 24:
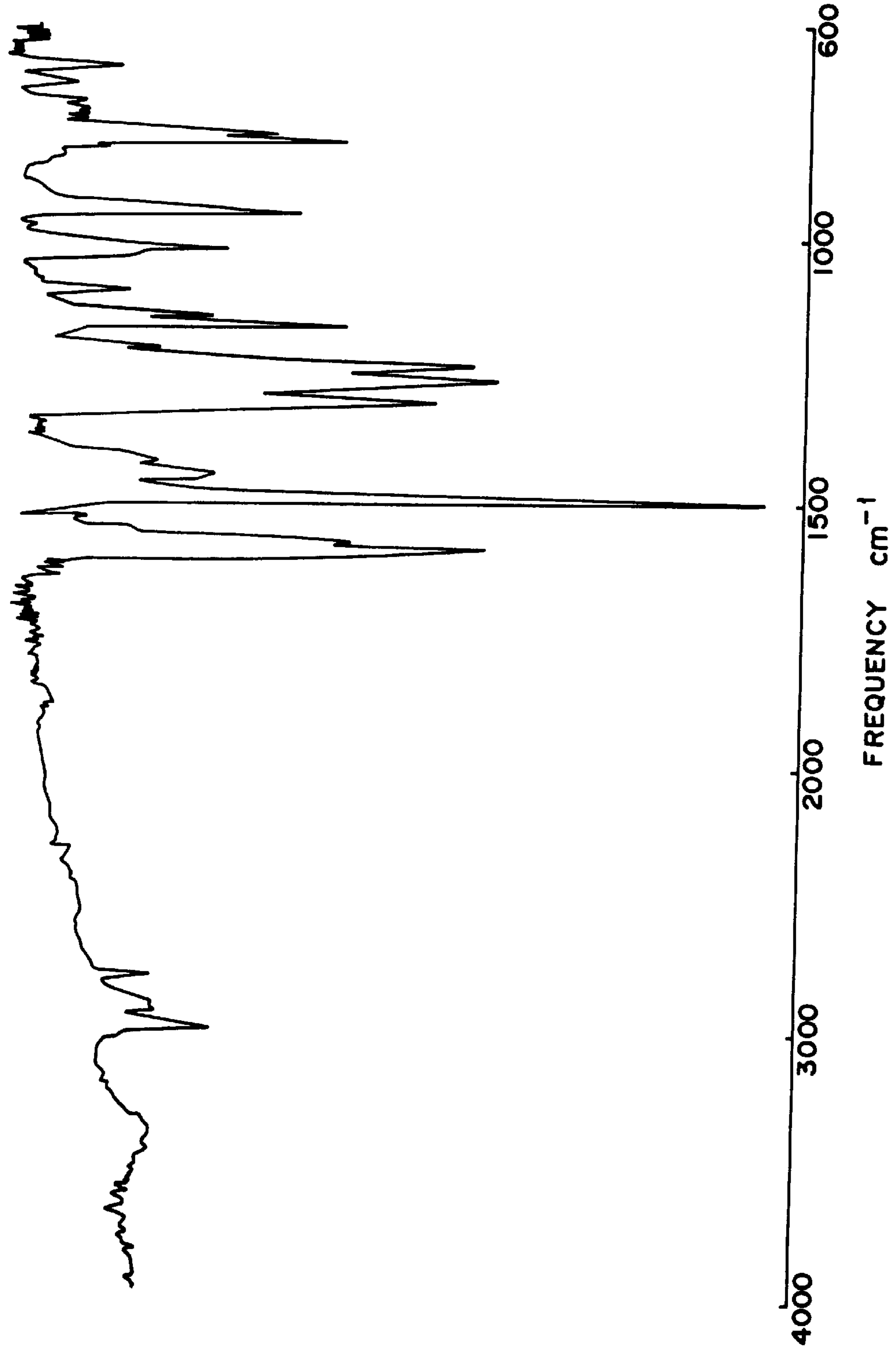
FIG. 24 is an IR spectrum of N-[4-(4-methoxystyryl) phenyl]-N-[4-(3-methoxystyryl)phenyl]-N-(4-methylphenyl)amine obtained in Preparation Example 3, that is, an intermediate for a hydroxyl-group-containing stilbene compound No. 3 obtained in Preparation Example 6.

An infrared spectrum of this compound of formula (3), taken by use of a KBr tablet, is shown in FIG. 24.

Preparation Example 4

[Preparation of hydroxyl-group-containing stilbene compound No. 1, i.e. N,N-bis[4-(3-hydroxystyryl) phenyl]-N-(4-methylphenyl)amine]

29.00 g (55.3 mmol) of N,N-bis[4-(3-methoxystyryl) phenyl]-N-(4-methylphenyl)amine of formula (1), obtained in Preparation Example 1, and 31.1 g (369 mmol) of sodium thioethylate were added to 300 ml of dry DMF, and the above prepared mixture was refluxed under application of heat thereto in a stream of nitrogen for 7 hours.

After the reaction mixture was cooled to room temperature, it was poured into iced water, neutralized with concentrated hydrochloric acid, and then extracted with ethyl acetate. The resultant organic layer was washed with water and dried over magnesium sulfate, and then, the solvent was distilled away from the reaction mixture. The obtained crude product was chromatographed twice on a silica gel column using a developing solvent consisting of toluene and ethyl acetate at a mixing ratio of 5:1, and then the obtained product was washed with cyclohexane, whereby 26.32 g of a hydroxyl-group-containing stilbene compound No. 1, that is, N,N-bis[4-(3-hydroxystyryl) phenyl]-N-(4-methylphenyl)amine, represented by formula (4) was obtained as yellow powder in a yield of 95.9%. The above-mentioned hydroxyl-group-containing stilbene compound was amorphous.

(4)

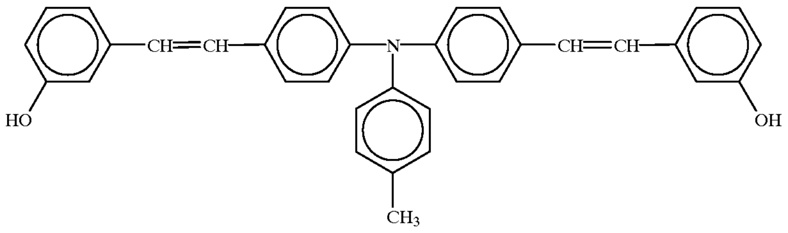

The results of the elemental analysis of the hydroxyl-group-containing stilbene compound No. 1 are as follows:

Elemental analysis:

| | % C | % H | % N |
|---|---|---|---|
| Found | 84.91 | 6.48 | 2.54 |
| Calcd. | 84.87 | 6.41 | 2.65 |

The calculation is based on the formula for $C_{35}H_{29}NO_2$•$0.38C_6H_{12}$ (adduct of $C_{35}H_{29}NO_2$ with 0.38 mol of cyclohexane.)

Figure 25:
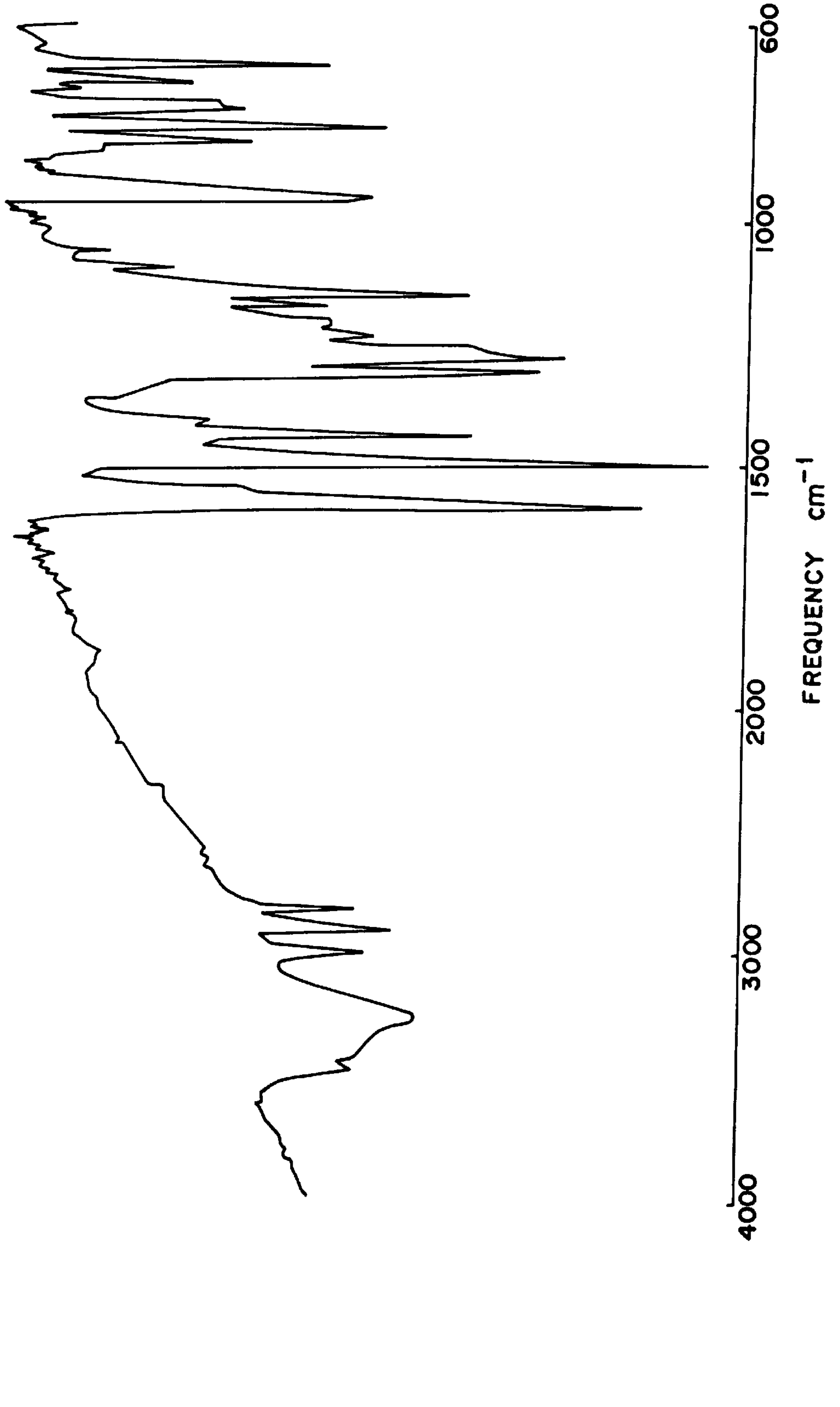
FIG. 25 is an IR spectrum of a hydroxyl-group-containing stilbene compound No. 1 obtained in Preparation Example 4.

An infrared spectrum of this hydroxyl-group-containing stilbene compound No. 1, taken by use of a KBr tablet, is shown in FIG. 25.

Preparation Example 5

[Preparation of hydroxyl-group-containing stilbene compound No. 2, i.e. N,N-bis[4-(4-hydroxystyryl) phenyl]-N-(4-methylphenyl)amine]

27.60 g (52.7 mmol) of N,N-bis[4-(4-methoxystyryl) phenyl]-N-(4-methylphenyl)amine of formula (2), obtained in Preparation Example 2, and 30.8 g (366 mmol) of sodium thioethylate were added to 300 ml of dry DMF, and the above prepared mixture was refluxed under application of heat thereto in a stream of nitrogen for 5 hours.

After the reaction mixture was cooled to room temperature, it was poured into iced water, neutralized with concentrated hydrochloric acid, and then extracted with ethyl acetate. The resultant organic layer was washed with water and dried over magnesium sulfate, and then, the solvent was distilled away from the reaction mixture. The obtained crude product was chromatographed three times on a silica gel column using a developing solvent consisting of toluene and ethyl acetate at a mixing ratio of 5:1, and then the obtained product was washed with cyclohexane, whereby 18.74 g of a hydroxyl-group-containing stilbene compound No. 2, that is, N,N-bis[4-(4-hydroxystyryl) phenyl]-N-(4-methylphenyl)amine, represented by formula (5) was obtained as a yellow powder in a yield of 71.7%. The above-mentioned hydroxyl-group-containing stilbene compound was amorphous.

(5)

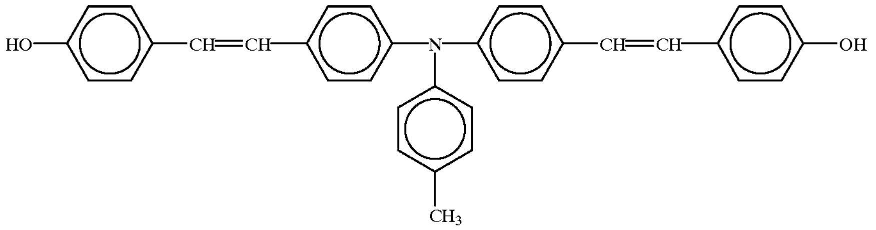

The results of the elemental analysis of the hydroxyl-group-containing stilbene compound No. 2 are as follows:

Elemental analysis:

| | % C | % H | % N |
|---|---|---|---|
| Found | 84.58 | 5.79 | 2.89 |
| Calcd. | 84.82 | 5.90 | 2.83 |

Figure 26:
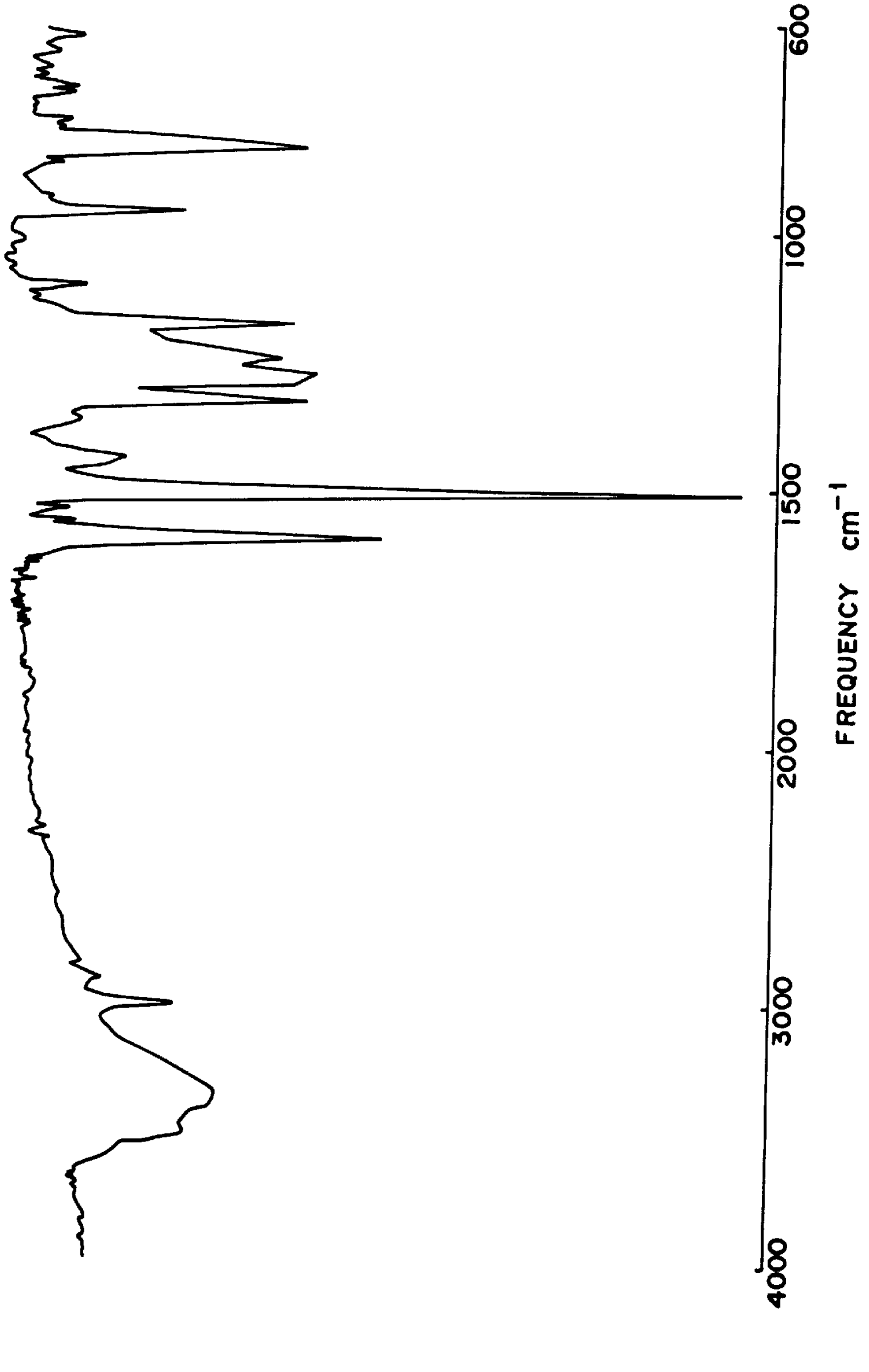
FIG. 26 is an IR spectrum of a hydroxyl-group-containing stilbene compound No. 2 obtained in Preparation Example 5.

An infrared spectrum of this hydroxyl-group-containing stilbene compound No. 2, taken by use of a KBr tablet, is shown in FIG. 26.

Preparation Example 6

[Preparation of hydroxyl-group-containing stilbene compound No. 3, i.e. N-[4-(4-hydroxystyryl) phenyl]-N-[4-(3-hydroxystyryl)phenyl]-N-(4-methylphenyl)amine]

26.19 g (52.7 mmol) of N-[4-(4-methoxystyryl)phenyl]-N-[4-(3-methoxystyryl)phenyl]-N-(4-methylphenyl)amine of formula (3), obtained in Preparation Example 3, and 30.8 g (366 mmol) of sodium thioethylate were added to 300 ml of dry DMF, and the above prepared mixture was refluxed under application of heat thereto in a stream of nitrogen for 5 hours.

After the reaction mixture was cooled to room temperature, it was poured into iced water, neutralized with concentrated hydrochloric acid, and then extracted with ethyl acetate. The resultant organic layer was washed with water and dried over magnesium sulfate, and then, the solvent was distilled away from the reaction mixture. The obtained crude product was chromatographed twice on a silica gel column using a developing solvent consisting of toluene and ethyl acetate at a mixing ratio of 5:1, and then the obtained product was washed with cyclohexane, whereby 19.81 g of a hydroxyl-group-containing stilbene compound No. 3, that is, N-[4-(4-hydroxystyryl)phenyl]-N-[4-(3-hydroxystyryl)phenyl]-N-(4-methylphenyl)amine, represented by formula (6) was obtained as a yellow powder in a yield of 79.9%. The above-mentioned hydroxyl-group-containing stilbene compound was amorphous.

(6)

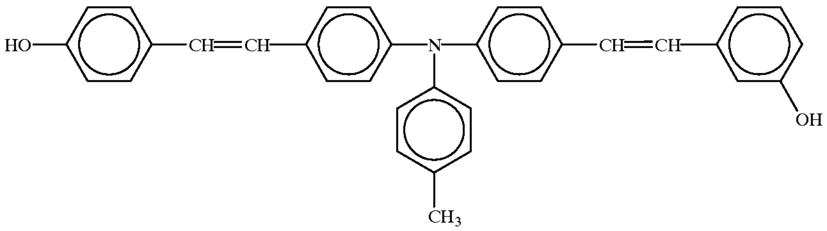

The results of the elemental analysis of the hydroxyl-group-containing stilbene compound No. 3 are as follows:

Elemental analysis:

| | % C | % H | % N |
|---|---|---|---|
| Found | 84.69 | 6.04 | 2.66 |
| Calcd. | 84.82 | 5.90 | 2.83 |

Figure 27:
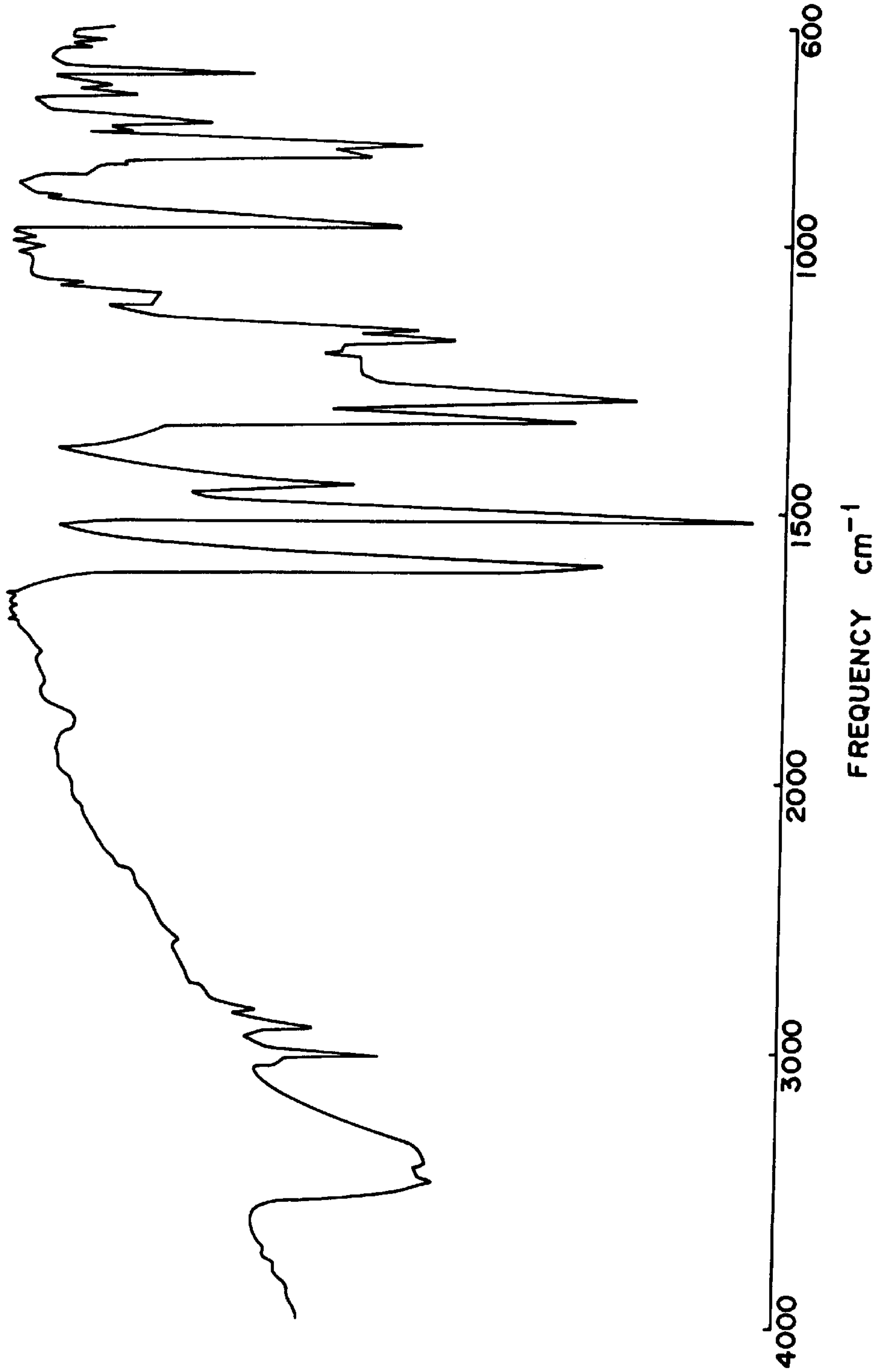
FIG. 27 is an IR spectrum of a hydroxyl-group-containing stilbene compound No. 3 obtained in Preparation Example 6.

An infrared spectrum of this hydroxyl-group-containing stilbene compound No. 3, taken by use of a KBr tablet, is shown in FIG. 27.

EXAMPLE 1-1

[Synthesis of aromatic polycarbonate resin No. 1)]

4.96 parts by weight of N,N-bis[4-(3-hydroxystyryl) phenyl]-N-(4-methylphenyl)amine obtained in Preparation Example 4, represented by formula (4), were dissolved in 40 parts by weight of dry tetrahydrofuran.

(4)

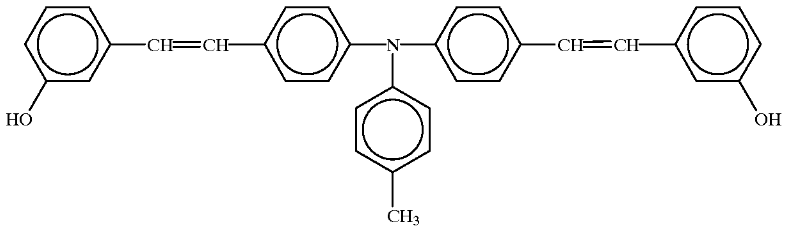

Then, 3.04 parts by weight of triethylamine were added to the above solution with stirring in a stream of nitrogen, thereby obtaining a mixture (a). A solution prepared by dissolving 2.31 parts by weight of diethylene glycol bis (chloroformate) in 8 parts by weight of tetrahydrofuran was added dropwise to the mixture (a) over a period of 30 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

Thereafter, the separating salt was removed from the reaction mixture by filtration. The resultant filtrate was added dropwise to methanol, and a crude product was obtained by filtration. The thus obtained crude product was purified by repeating the process of dissolving the product in tetrahydrofuran and precipitating it in methanol twice, so that an aromatic polycarbonate resin No. 1 according to the present invention having a repeat unit of the following formula was obtained. [Aromatic polycarbonate resin No. 1]

The glass transition temperature (Tg) of the aromatic polycarbonate resin No. 1 was 114.9° C.

The polystyrene-reduced number-average molecular weight and weight-average molecular weight, which were measured by the gel permeation chromatography, were respectively 32,300 and 112,000.

The results of the elemental analysis of the thus obtained compound are as follows:

Elemental analysis:

| | % C | % H | % N |
|---|---|---|---|
| Found | 75.09 | 5.37 | 2.04 |
| Calcd. | 75.33 | 5.40 | 2.14 |

Figure 7:
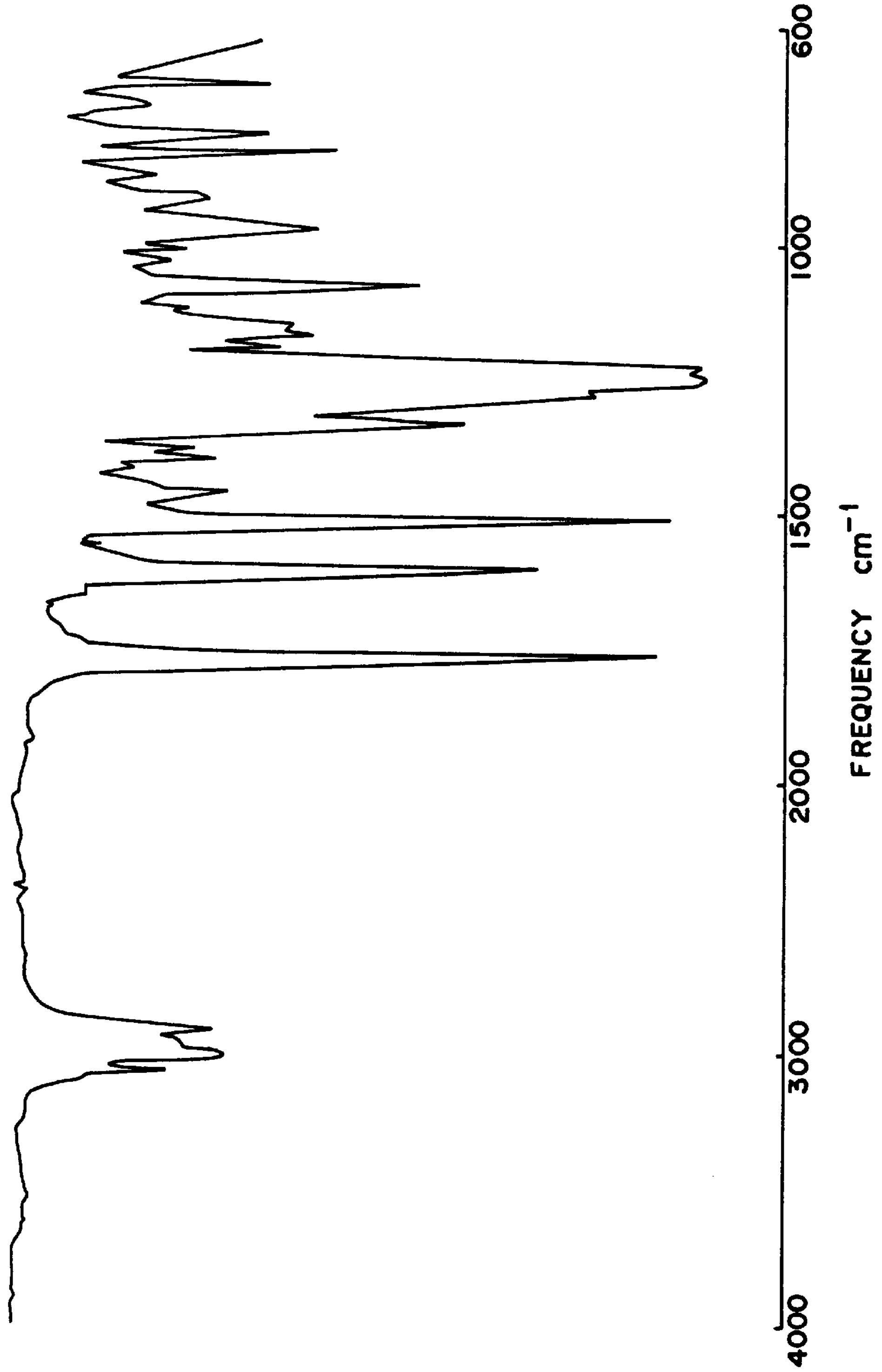
FIGS. 7 through 21 are IR spectra of aromatic polycarbonate resins respectively synthesized in Examples 1-1 to 1-15 according to the present invention, taken by use of an NaCl film.

FIG. 7 shows an infrared spectrum of the aromatic polycarbonate resin No. 1, taken by use of an NaCl film.

The IR spectrum indicates the appearance of the characteristic absorption peak due to C═O stretching vibration of carbonate at 1760 $cm^{-1}$.

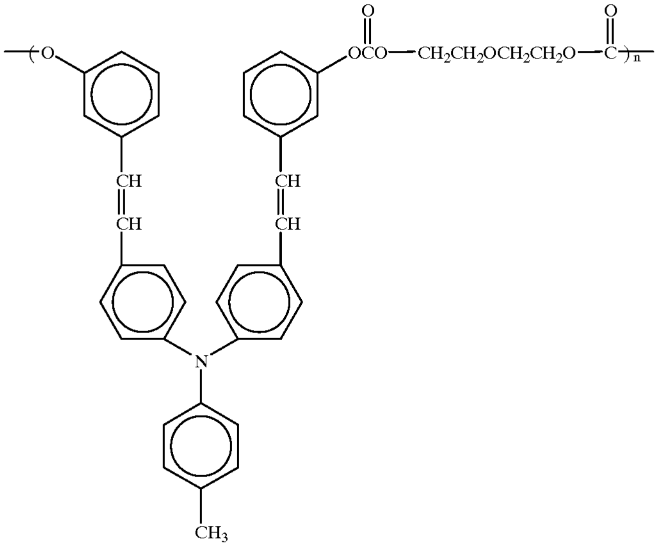

EXAMPLE 1-2

[Synthesis of aromatic polycarbonate resin No. 2)]

4.96 parts by weight of N,N-bis[4-(3-hydroxystyryl) phenyl]-N-(4-methylphenyl)amine obtained in Preparation Example 4, represented by formula (4), were dissolved in 40 parts by weight of dry tetrahydrofuran. Then, 3.04 parts by weight of triethylamine were added to the above solution with stirring in a stream of nitrogen, thereby obtaining a mixture (a). A solution prepared by dissolving 3.66 parts by weight of polytetramethylene ether glycol bis (chloroformate), which was prepared from polytetramethylene ether glycol with an average molecular weight of 250, in 8 parts by weight of tetrahydrofuran was added dropwise to the mixture (a) over a period of 20 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

Thereafter, the separating salt was removed from the reaction mixture by filtration. The resultant filtrate was added dropwise to methanol, and a crude product was obtained by filtration. The obtained crude product was purified by repeating the process of dissolving the product in tetrahydrofuran and precipitating it in methanol twice, so that an aromatic polycarbonate resin No. 2 according to the present invention having a repeat unit of the following formula was obtained. [Aromatic polycarbonate resin No. 2]

The glass transition temperature (Tg) of the aromatic polycarbonate resin No. 2 was 63.0° C.

The polystyrene-reduced number-average molecular weight and weight-average molecular weight, which were measured by the gel permeation chromatography, were respectively 27,500 and 66,200.

The results of the elemental analysis of the thus obtained compound are as follows:

Elemental analysis:

| | % C | % H | % N |
|---|---|---|---|
| Found | 74.93 | 6.78 | 1.71 |
| Calcd. | 75.19 | 6.61 | 1.78 |

Figure 8:
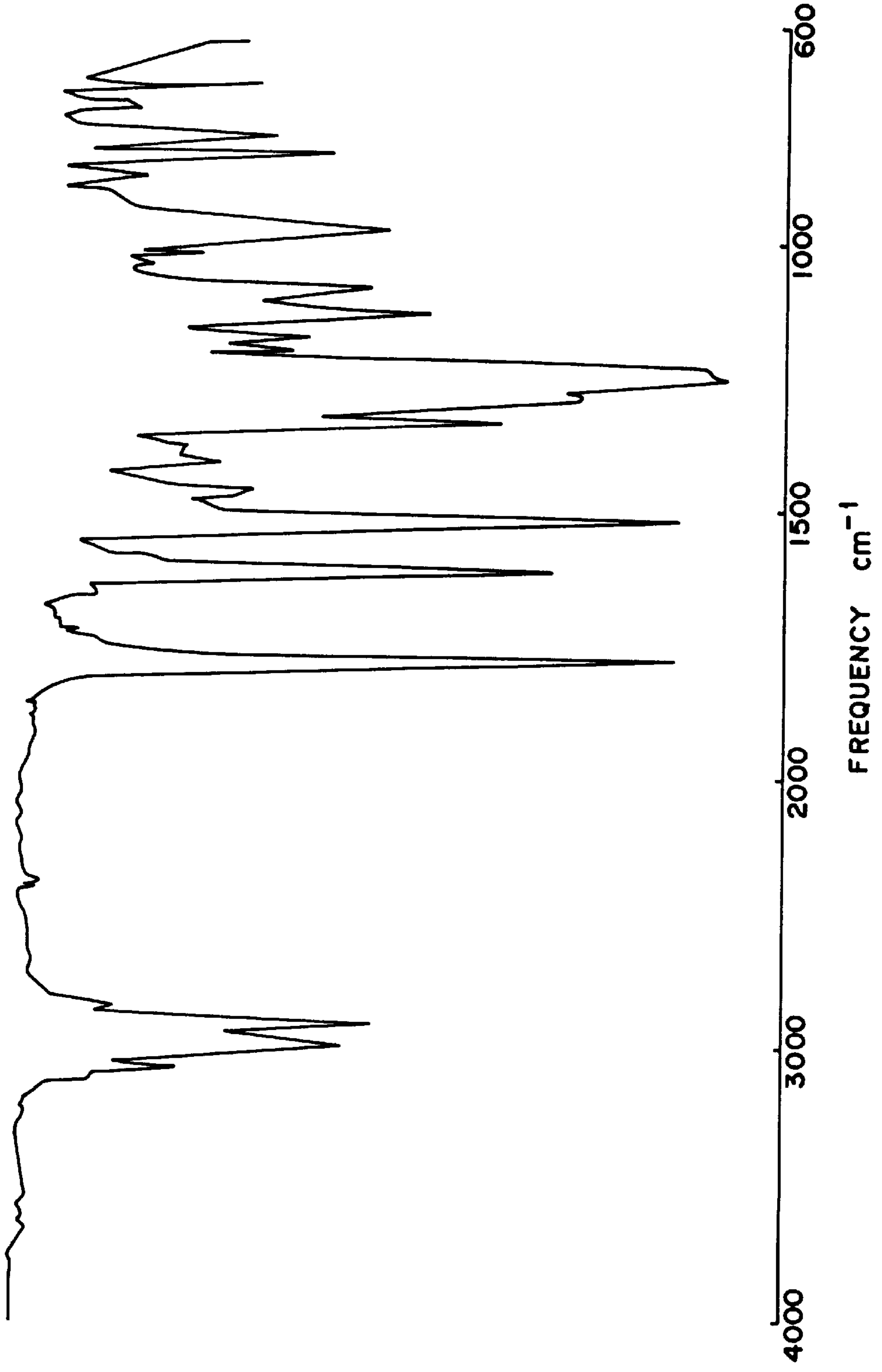

FIG. 8 shows an infrared spectrum of the aromatic polycarbonate resin No. 2, taken by use of an NaCl film.

The IR spectrum indicates the appearance of the characteristic absorption peak due to C═O stretching vibration of carbonate at 1760 $cm^{-1}$.

EXAMPLES 1-3 and 1-4

[Synthesis of aromatic polycarbonate resins Nos. 3 and 4]

The procedure for preparation of the aromatic polycarbonate resin No. 1 in Example 1-1 was repeated except that diethylene glycol bis(chloroformate) used in Example 1-1 was replaced by the respective bis(chloroformate) compounds.

Thus, aromatic polycarbonate resins No. 3 and No. 4 according to the present invention were obtained, respectively having repeat units of the following formulae:

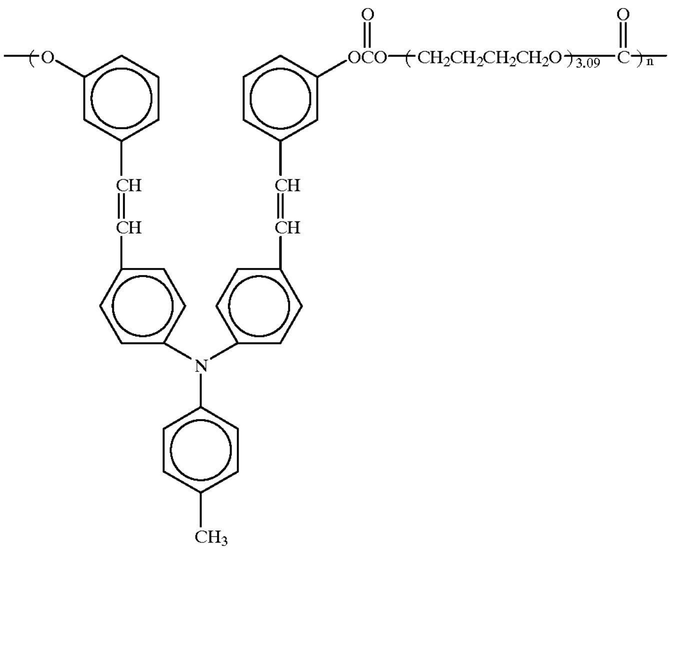

[Aromatic polycarbonate resin No. 3]

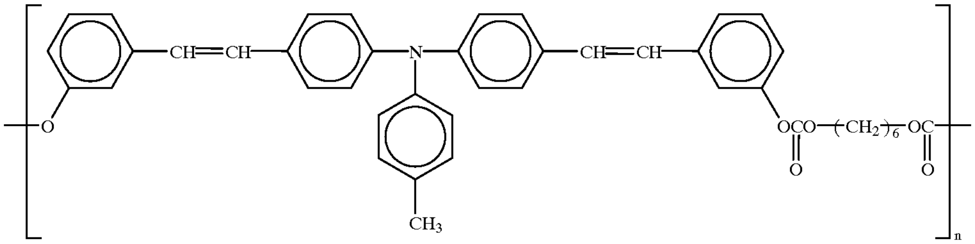

[Aromatic polycarbonate resin No. 4]

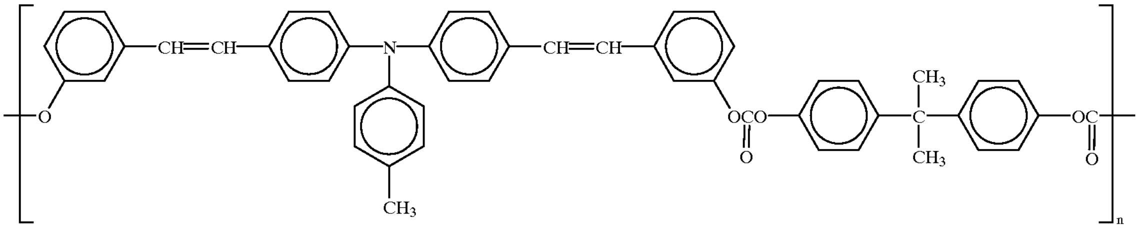

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 3 and No. 4 are shown in Table 1.

Figure 9:
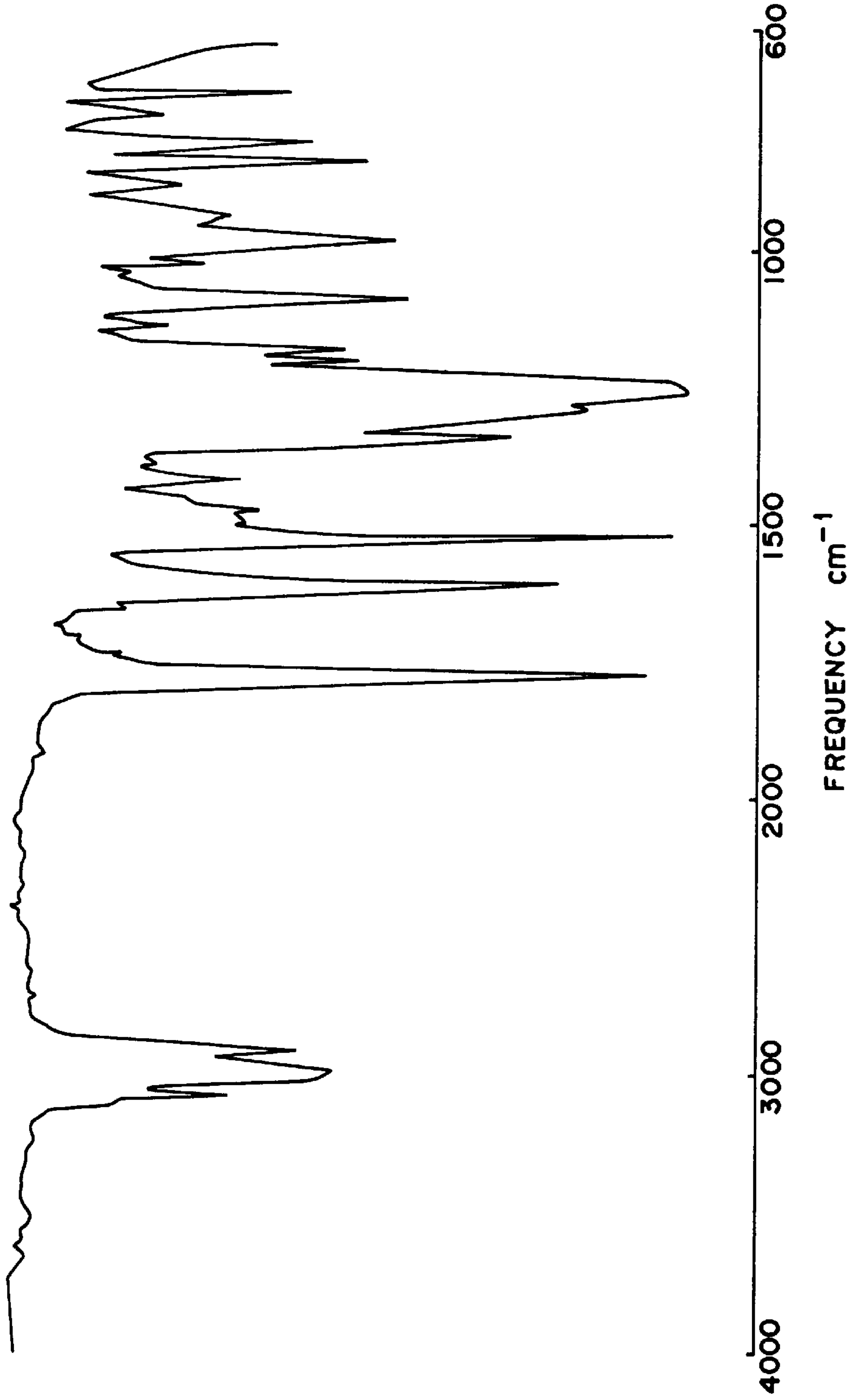
Figure 10:
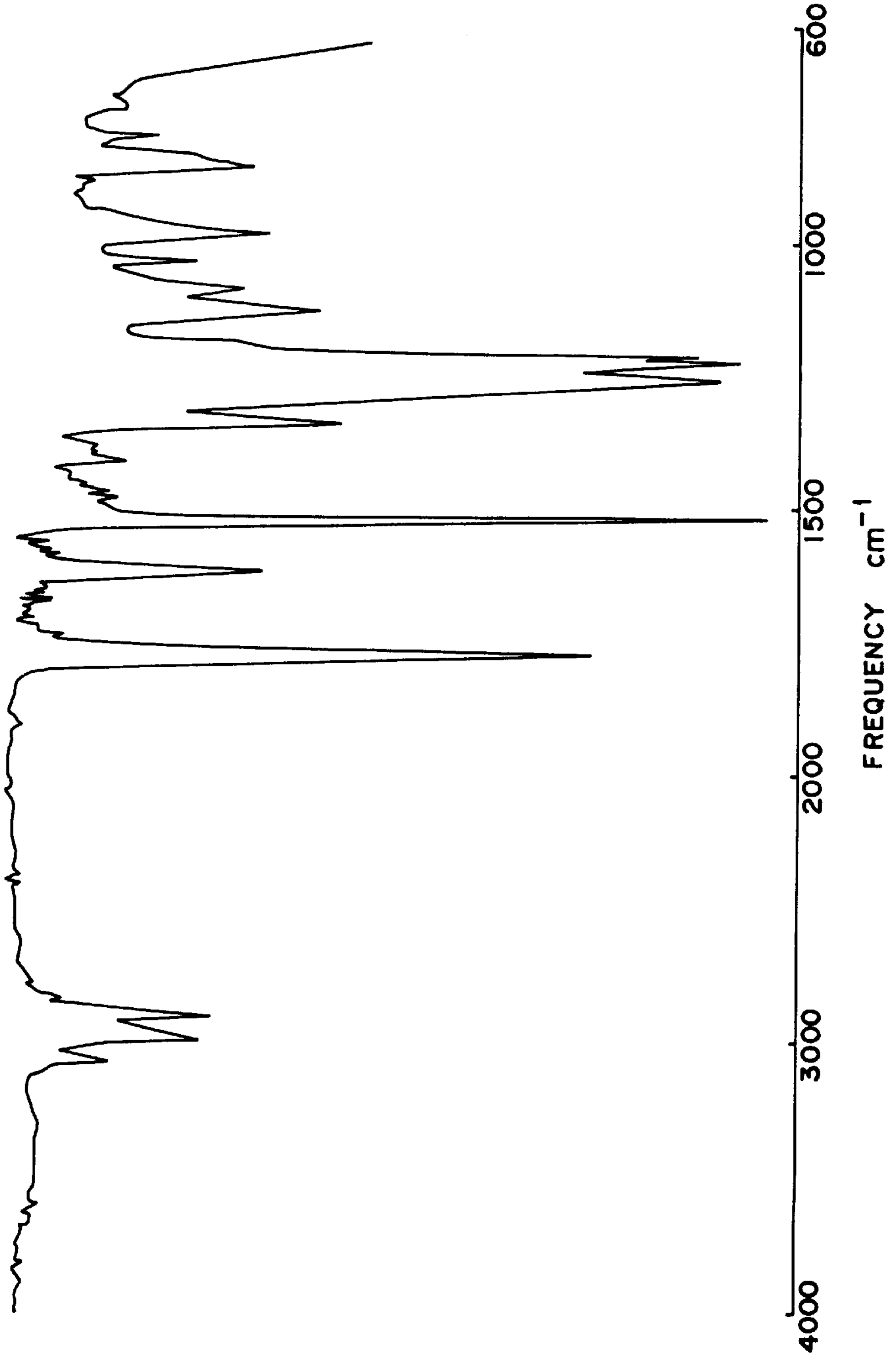

FIGS. 9 and 10 respectively show infrared spectra of the aromatic polycarbonate resins No. 3 and No. 4 obtained in Examples 1-3 and 1-4, taken by use of an NaCl film.

EXAMPLE 1-5

[Synthesis of aromatic polycarbonate resin No. 5]

4.00 parts by weight of N-[4-(4-hydroxystyryl)phenyl]-N-[4-(3-hydroxystyryl)phenyl]-N-(4-methylphenyl)amine obtained in Preparation Example 6, represented by formula (6), were dissolved in 35 parts by weight of dry tetrahydrofuran.

(6)

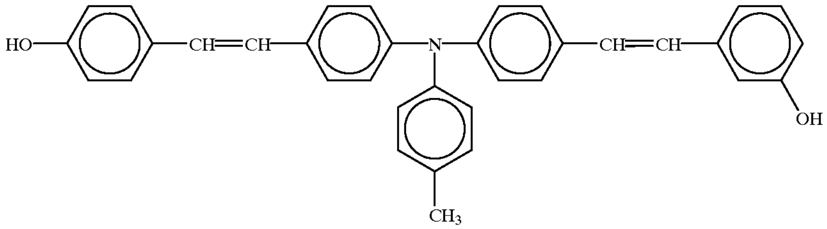

Then, 2.45 parts by weight of triethylamine were added to the above solution with stirring in a stream of nitrogen, thereby obtaining a mixture (a). A solution prepared by dissolving 1.86 parts by weight of diethylene glycol bis (chloroformate) in 8 parts by weight of tetrahydrofuran was added dropwise to the mixture (a) over a period of 30 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

Thereafter, the separating salt was removed from the reaction mixture by filtration. The resultant filtrate was added dropwise to methanol, and a crude product was obtained by filtration. The obtained crude product was purified by repeating the process of dissolving the product in tetrahydrofuran and precipitating it in methanol twice, so that an aromatic polycarbonate resin No. 5 according to the present invention having a repeat unit of the following formula was obtained.

[Aromatic polycarbonate resin No. 5]

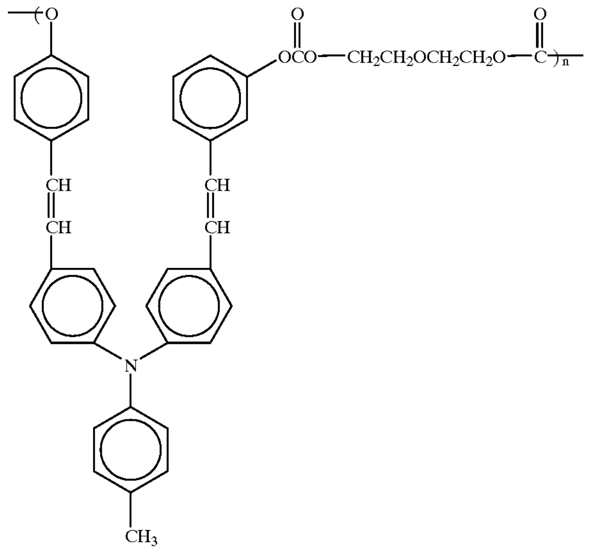

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 5 are shown in Table 1.

Figure 11:
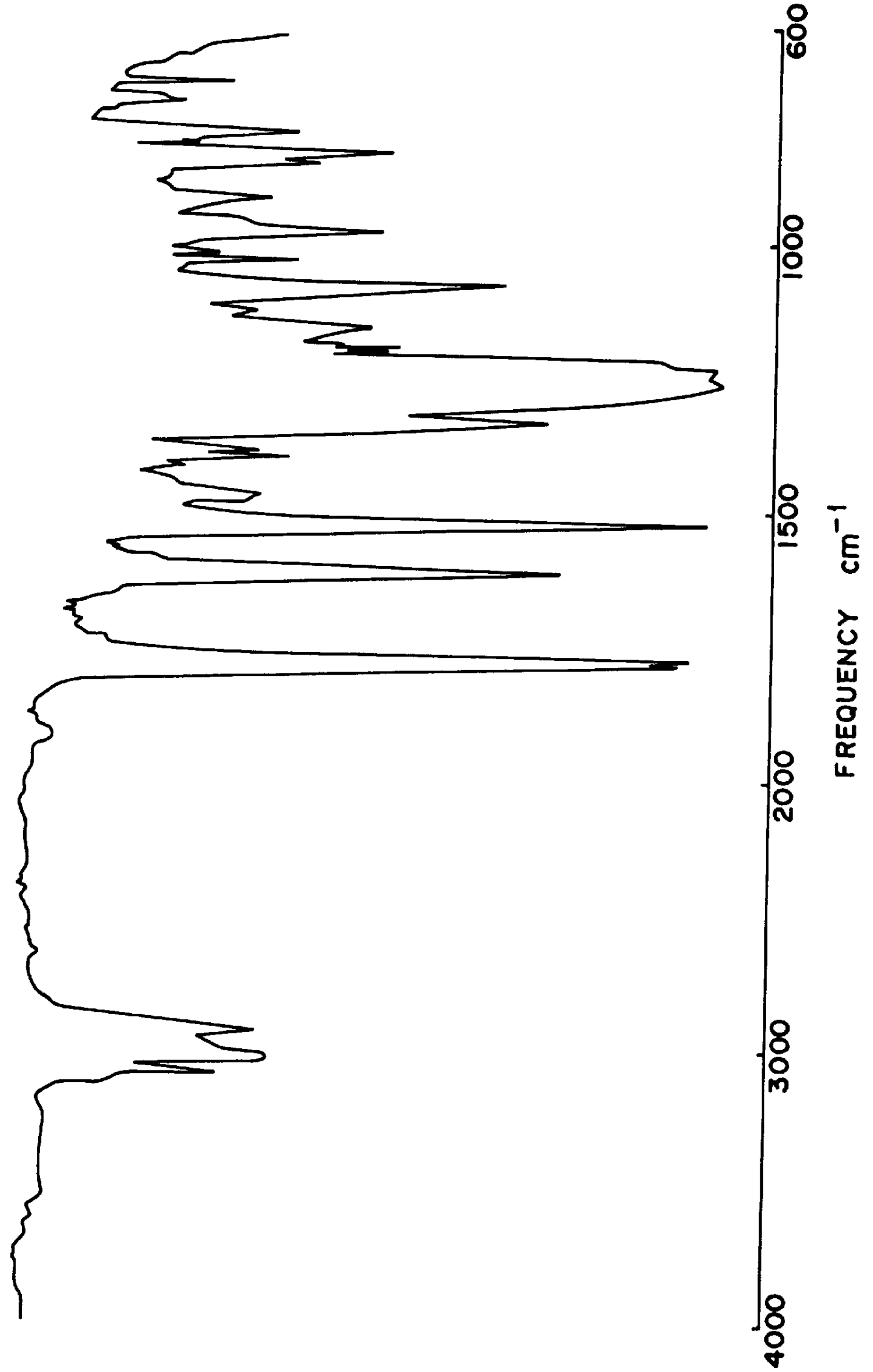

FIG. 11 shows an infrared spectrum of the aromatic polycarbonate resin No. 5 obtained in Example 1-5, taken by use of an NaCl film.

The IR spectrum indicates the appearance of the characteristic absorption peak due to C═O stretching vibration of carbonate at 1760 $cm^{-1}$.

EXAMPLE 1-6

[Synthesis of aromatic polycarbonate resin No. 6)]

4.86 parts by weight of N-[4-(4-hydroxystyryl)phenyl]-N-[4-(3-hydroxystyryl)phenyl]-N-(4-methylphenyl)amine obtained in Preparation Example 6, represented by formula (6), were dissolved in 40 parts by weight of dry tetrahydrofuran. Then, 2.94 parts by weight of triethylamine were added to the above solution with stirring in a stream of nitrogen, thereby obtaining a mixture (a). A solution prepared by dissolving 3.54 parts by weight of polytetramethylene ether glycol bis(chloroformate), which was prepared from polytetramethylene ether glycol with an average molecular weight of 250, in 8 parts by weight of tetrahydrofuran was added dropwise to the mixture (a) over a period of 20 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

Thereafter, the separating salt was removed from the reaction mixture by filtration. The resultant filtrate was added dropwise to methanol, and a crude product was obtained by filtration. The obtained crude product was purified by repeating the process of dissolving the product in tetrahydrofuran and precipitating it in methanol twice, so that an aromatic polycarbonate resin No. 6 according to the present invention having a repeat unit of the following formula was obtained.

[Aromatic polycarbonate resin No. 6]

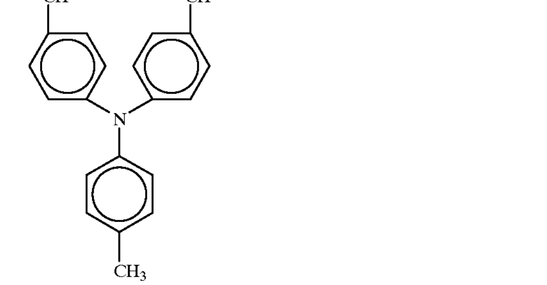

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 6 are shown in Table 1.

Figure 12:
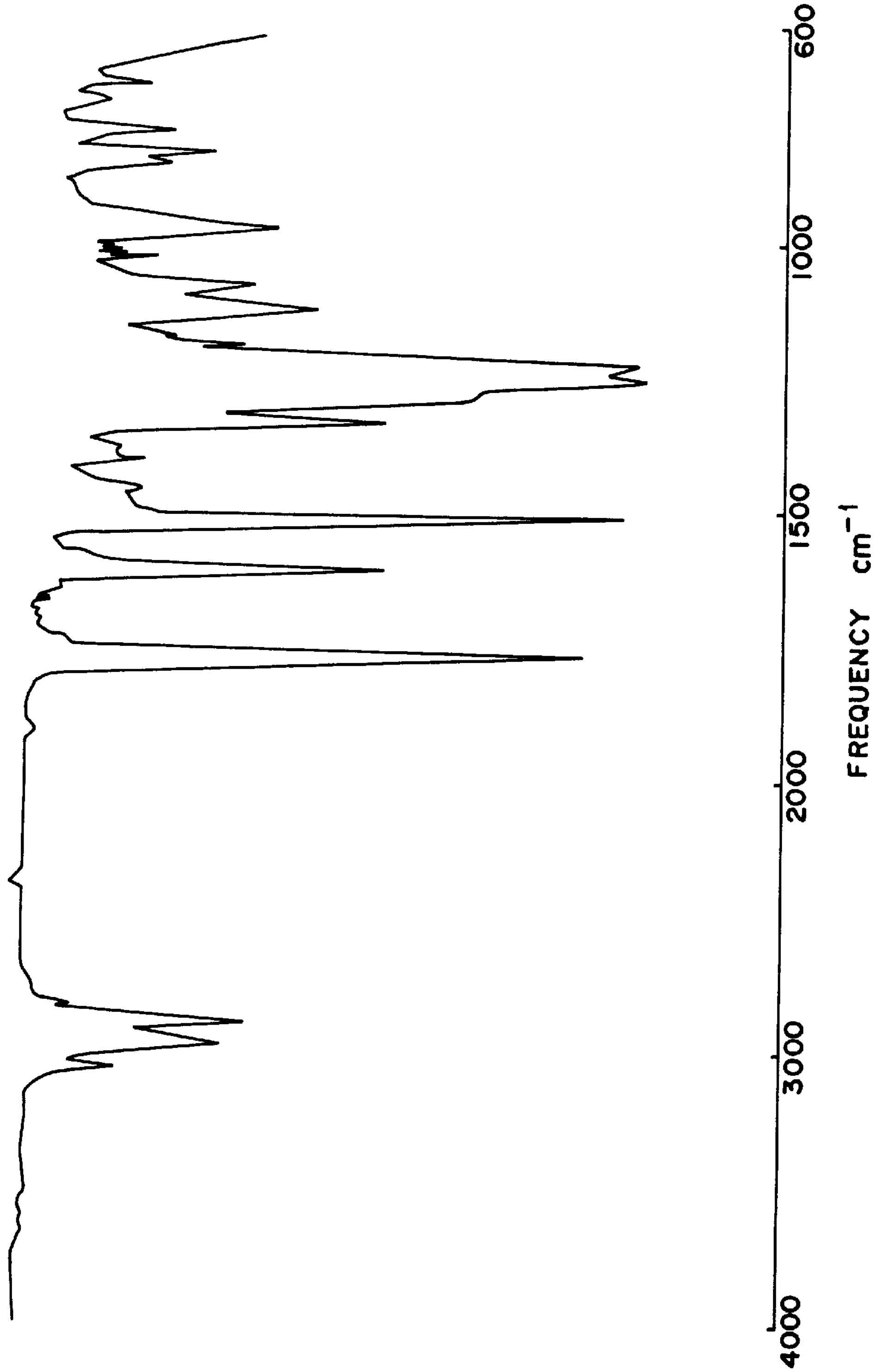

FIG. 12 shows an infrared spectrum of the aromatic polycarbonate resin No. 6, taken by use of an NaCl film.

The IR spectrum indicates the appearance of the characteristic absorption peak due to C═O stretching vibration of carbonate at 1760 $cm^{-1}$.

EXAMPLE 1-7

[Synthesis of aromatic polycarbonate resin No. 7)]

4.00 parts by weight of N-[4-(4-hydroxystyryl)phenyl]-N-[4-(3-hydroxystyryl)phenyl]-N-(4-methylphenyl)amine obtained in Preparation Example 6, represented by formula (6), were dissolved in 35 parts by weight of dry tetrahydrofuran. Then, 2.45 parts by weight of triethylamine were added to the above solution with stirring in a stream of nitrogen, thereby obtaining a mixture (a). A solution prepared by dissolving 1.96 parts by weight of hexamethylene glycol bis(chloroformate) in 8 parts by weight of tetrahydrofuran was added dropwise to the mixture (a) over a period of 20 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

(Mw), and the results of the elemental analysis of the obtained aromatic polycarbonate resin No. 7 are shown in Table 1.

Figure 13:
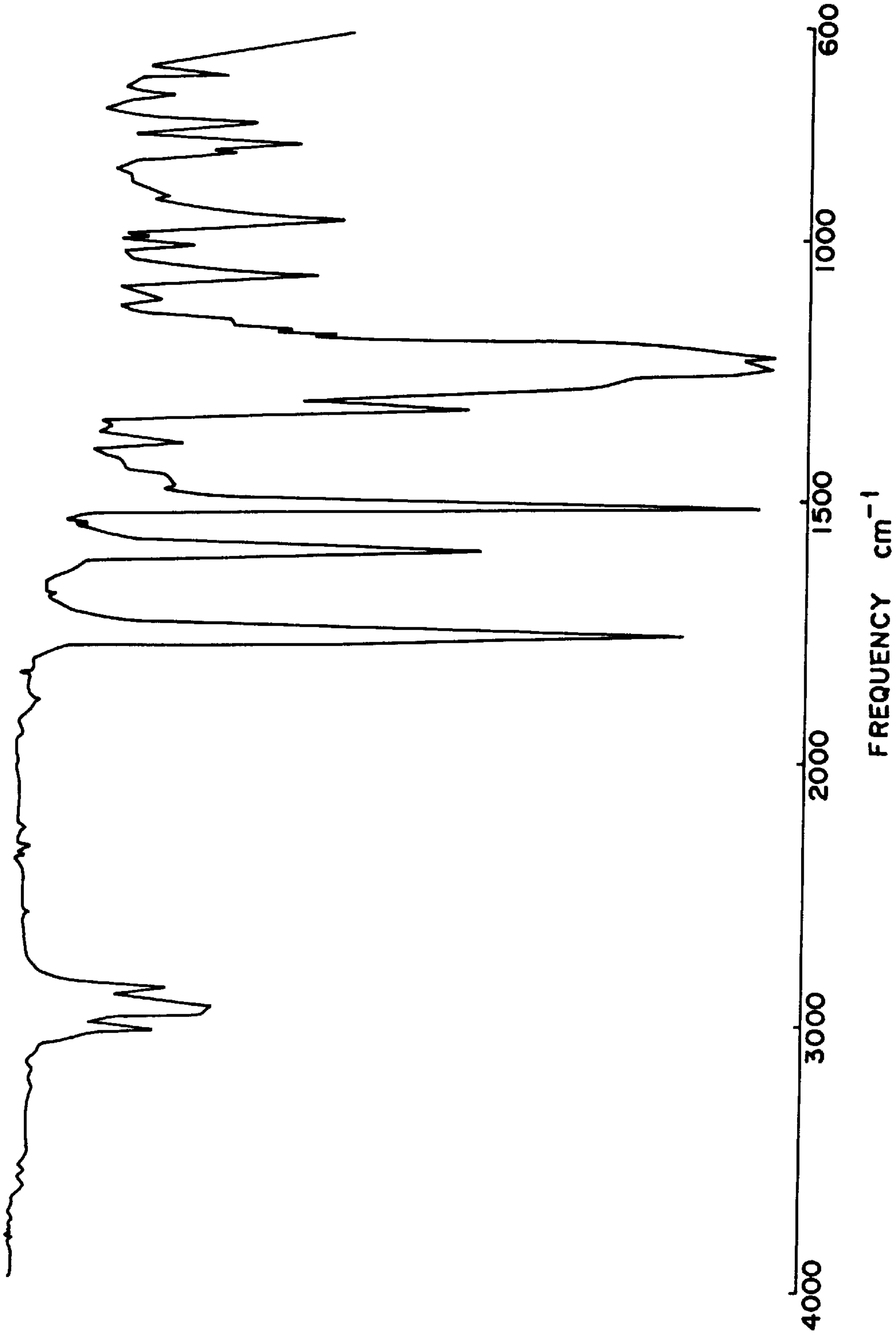

FIG. 13 shows an infrared spectrum of the aromatic polycarbonate resin No. 7, taken by use of an NaCl film.

The IR spectrum indicates the appearance of the characteristic absorption peak due to C═O stretching vibration of carbonate at 1760 $cm^{-1}$.

EXAMPLE 1-8

[Synthesis of aromatic polycarbonate resin No. 8]

4.00 parts by weight of N,N-bis[4-(4-hydroxystyryl)phenyl]-N-(4-methylphenyl)amine obtained in Preparation Example 5, represented by formula (5), were dissolved in 30 parts by weight of dry tetrahydrofuran.

(5)

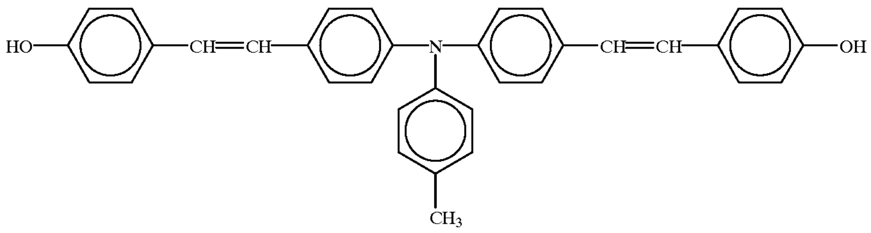

Thereafter, the separating salt was removed from the reaction mixture by filtration. The resultant filtrate was added dropwise to methanol, and a crude product was obtained by filtration. The obtained crude product was purified by repeating the process of dissolving the product in tetrahydrofuran and precipitating it in methanol twice, so that an aromatic polycarbonate resin No. 7 according to the present invention having a repeat unit of the following formula was obtained.

[Aromatic polycarbonate resin No. 7]

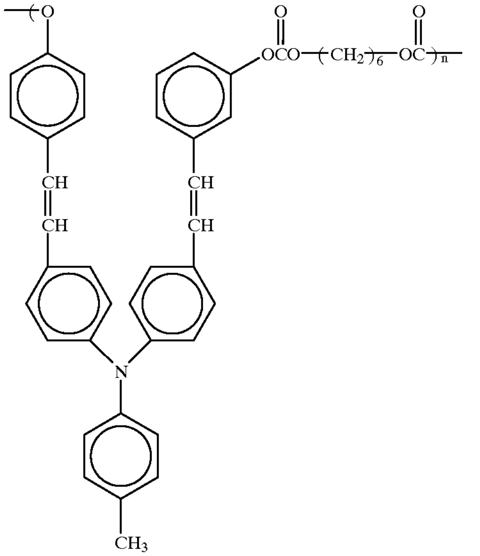

The glass transition temperature (Tg), the polystyrene-reduced number-average molecular weight (Mn), the polystyrene-reduced weight-average molecular weight Then, 2.45 parts by weight of triethylamine were added to the above solution with stirring in a stream of nitrogen, thereby obtaining a mixture (a). A solution prepared by dissolving 1.87 parts by weight of diethylene glycol bis (chloroformate) in 8 parts by weight of tetrahydrofuran was added dropwise to the mixture (a) over a period of 30 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

Thereafter, the separating salt was removed from the reaction mixture by filtration. The resultant filtrate was added dropwise to methanol, and a crude product was obtained by filtration. The obtained crude product was purified by repeating the process of dissolving the product in tetrahydrofuran and precipitating it in methanol twice, so that an aromatic polycarbonate resin No. 8 according to the present invention having a repeat unit of the following formula was obtained.

[Aromatic polycarbonate resin No. 8]

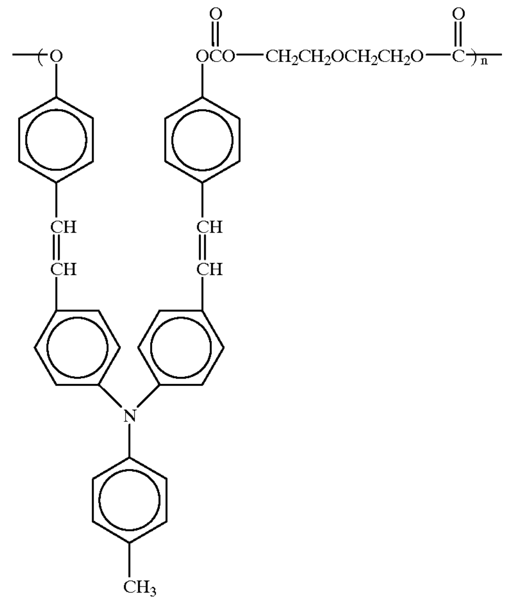

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 8 are shown in Table 1.

Figure 14:
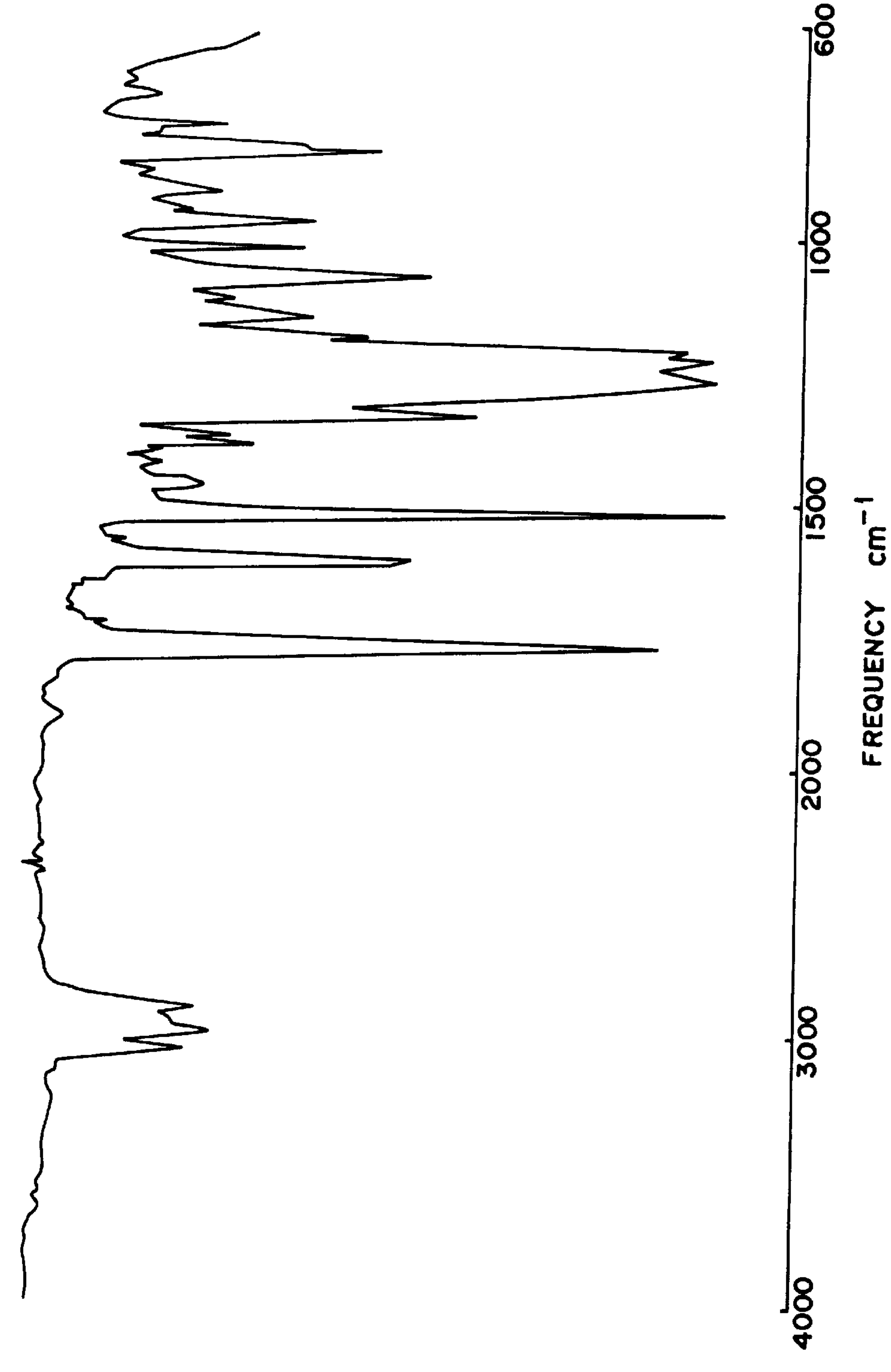

FIG. 14 shows an infrared spectrum of the aromatic polycarbonate resin No. 8, taken by use of an NaCl film.

The IR spectrum indicates the appearance of the characteristic absorption peak due to C═O stretching vibration of carbonate at 1760 $cm^{-1}$.

EXAMPLE 1-9

[Synthesis of aromatic polycarbonate resin No. 9)]

4.00 parts by weight of N,N-bis[4-(4-hydroxystyryl)phenyl]-N-(4-methylphenyl)amine obtained in Preparation Example 5, represented by formula (5), were dissolved in 35 parts by weight of dry tetrahydrofuran. Then, 2.45 parts by weight of triethylamine were added to the above solution with stirring in a stream of nitrogen, thereby obtaining a mixture (a). A solution prepared by dissolving 2.95 parts by weight of polytetramethylene ether glycol bis(chloroformate), which was prepared from polytetramethylene ether glycol with an average molecular weight of 250, in 8 parts by weight of tetrahydrofuran was added dropwise to the mixture (a) over a period of 40 minutes, with the mixture being cooled at 20° C. on a water bath.

After completion of the addition, the above obtained reaction mixture was stirred for 2 hours at room temperature to continue the reaction, and then one part by weight of a tetrahydrofuran solution containing 4 wt. % of phenol was added to the reaction mixture. Thus, the reaction was terminated.

Thereafter, the separating salt was removed from the reaction mixture by filtration. The resultant filtrate was added dropwise to methanol, and a crude product was obtained by filtration. The obtained crude product was purified by repeating the process of dissolving the product in tetrahydrofuran and precipitating it in methanol twice, so that an aromatic polycarbonate resin No. 9 according to the present invention having a repeat unit of the following formula was obtained.

[Aromatic polycarbonate resin No. 9]

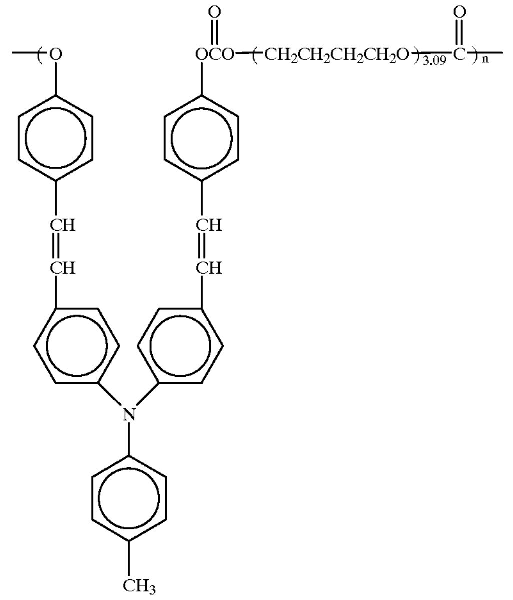

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 9 are shown in Table 1.

Figure 15:
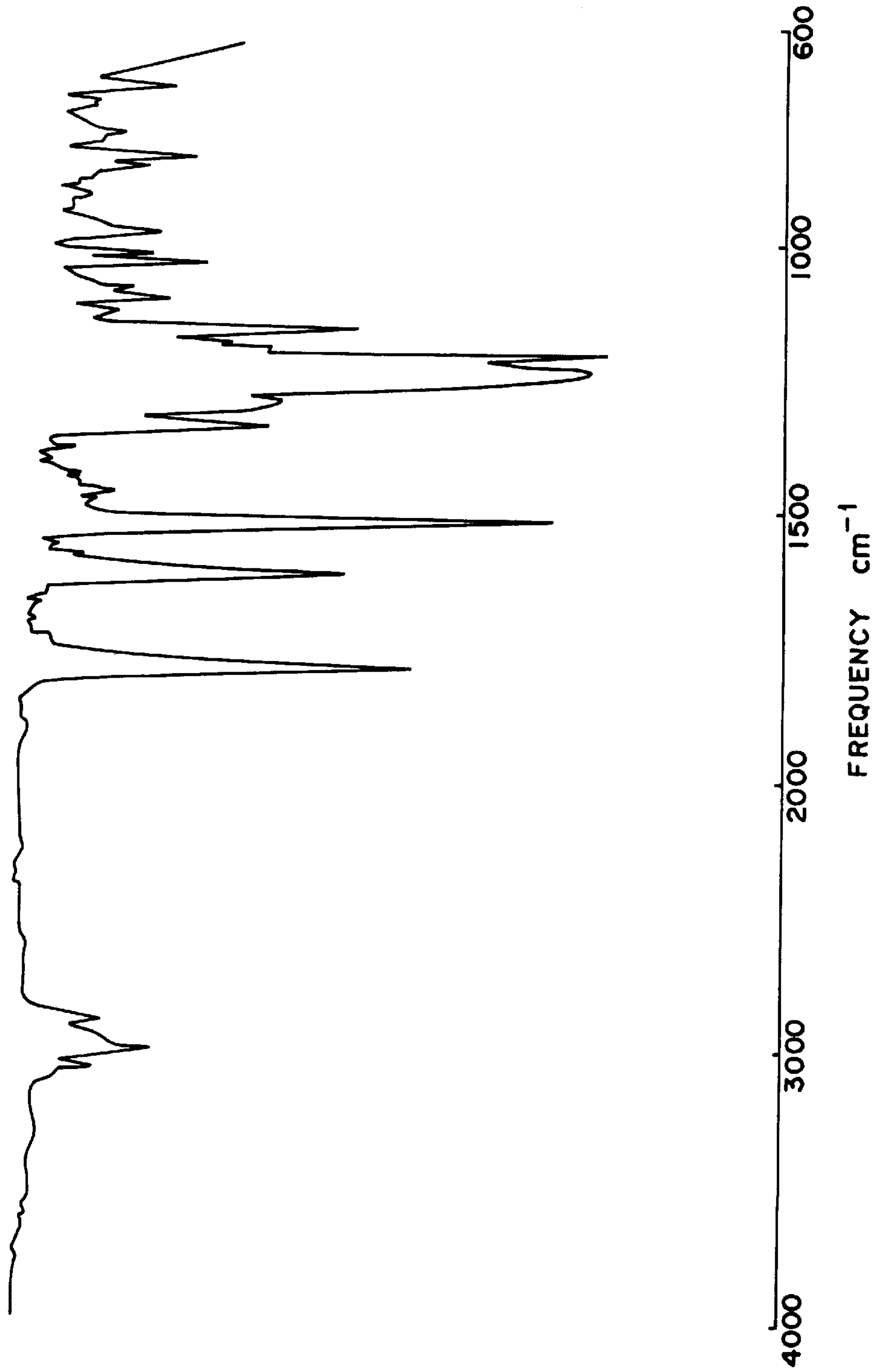

FIG. 15 shows an infrared spectrum of the aromatic polycarbonate resin No. 9, taken by use of an NaCl film.

The IR spectrum indicates the appearance of the characteristic absorption peak due to C═O stretching vibration of carbonate at 1760 $cm^{-1}$.

EXAMPLES 1-10 and 1-11

[Synthesis of aromatic polycarbonate resins No. 10 and No. 11]

The procedure for preparation of the aromatic polycarbonate resin No. 9 in Example 1-9 was repeated except that polytetramethylene ether glycol bis(chloroformate) used in Example 1-9 was replaced by the respective bis(chloroformate) compounds.

Thus, aromatic polycarbonate resins No. 10 and No. 11 according to the present invention were obtained, respectively having repeat units of the following formulae:

[Aromatic polycarbonate resin No. 10]

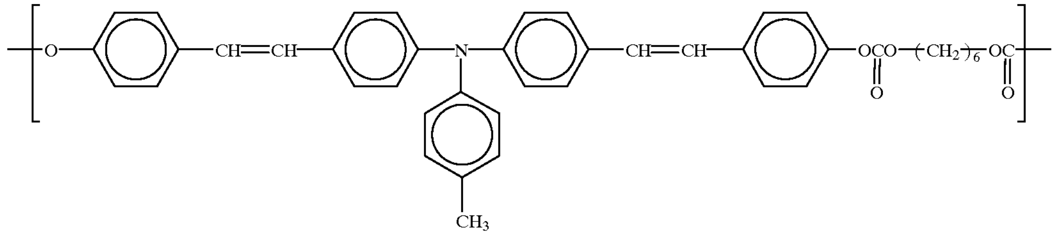

[Aromatic polycarbonate resin No. 11]

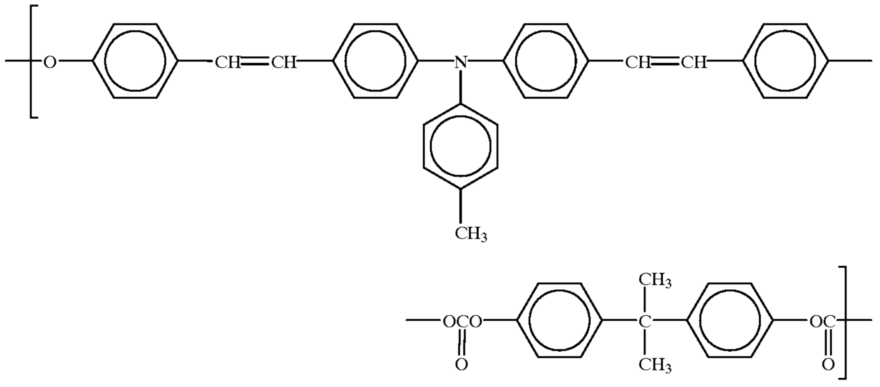

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 10 and No. 11 are shown in Table 1.

Figure 16:
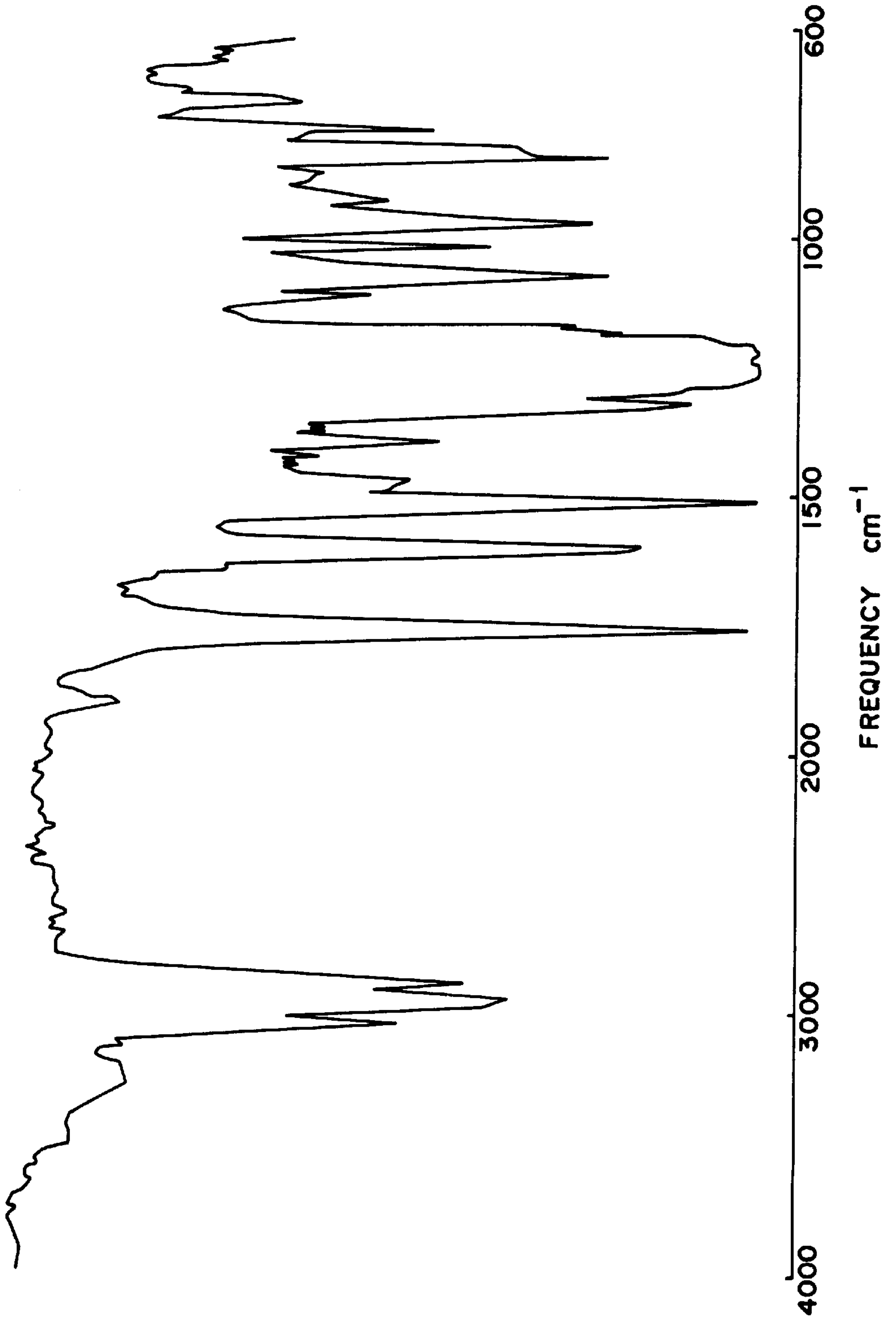
Figure 17:
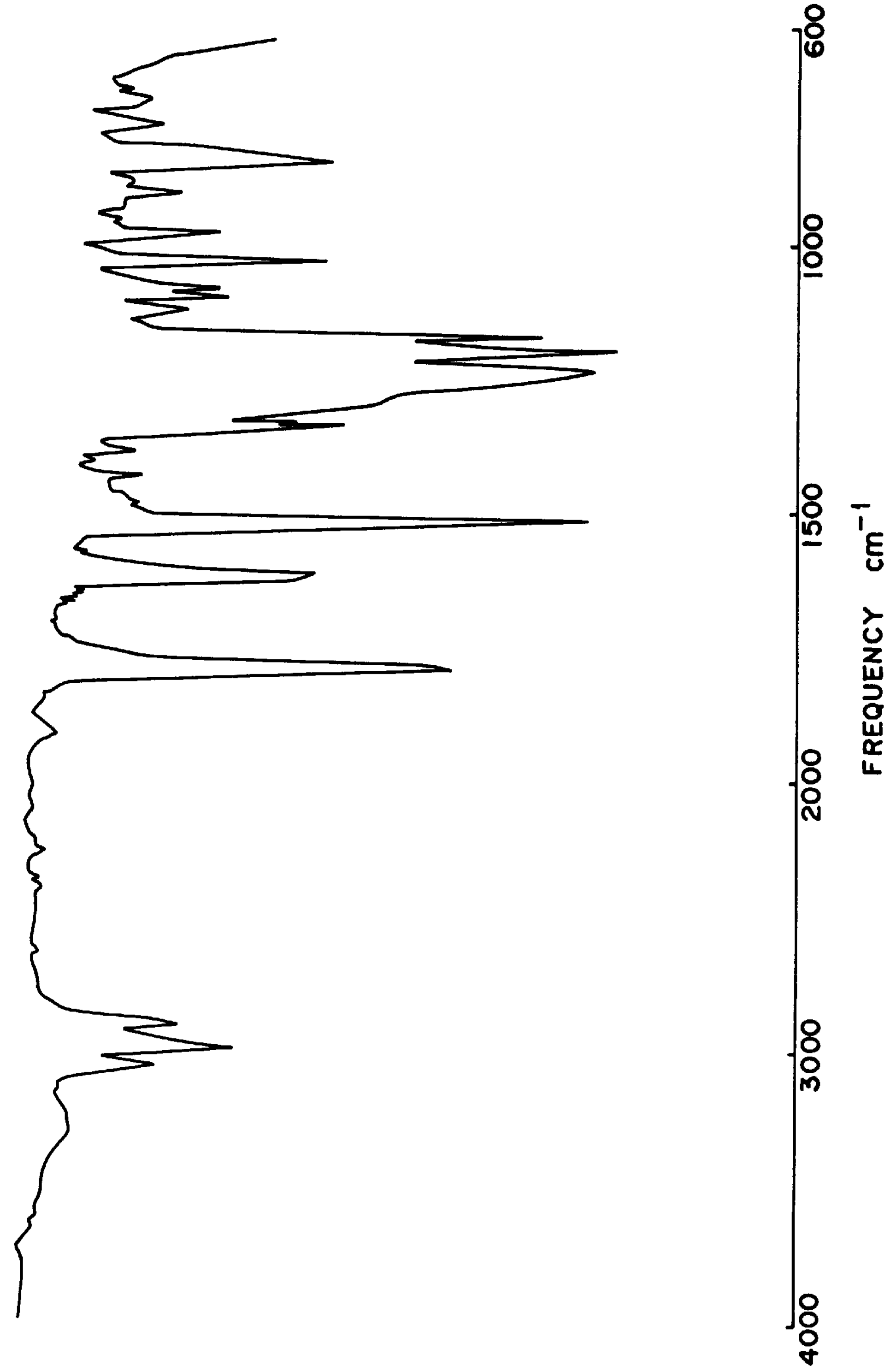

FIGS. 16 and 17 respectively show infrared spectra of the aromatic polycarbonate resins No. 10 and No. 11 obtained in Examples 1-10 and 1-11, taken by use of an NaCl film.

EXAMPLE 1-12

[Synthesis of aromatic polycarbonate resin No. 12]

1.98 g (4.0 mmol) of N,N-bis[4-(4-hydroxystyryl) phenyl]-N-(4-methylphenyl)amine obtained in Preparation Example 5, represented by formula (5), 1.48 g (5.5 mmol) of 1,1-bis(4-hydroxyphenyl)cyclohexane, and 0.029 g of 4-tert-butylphenol were placed into a reaction vessel. An aqueous solution prepared by dissolving 1.52 g of sodium hydroxide and 0.07 g of sodium hydrosulfite in 50 ml of water was added to the above-mentioned mixture in the reaction vessel in a stream of argon gas, and a mixture thus obtained was stirred. A solution prepared by dissolving 1.69 g of triphosgene in 35 ml of dichloromethane was added dropwise to the above-mentioned mixture over a period of 4 minutes with vigorously stirring under ice-cooled condition, thereby forming an emulsion with the progress of a reaction.

Thereafter, 0.23 g of sodium hydroxide was added to the reaction mixture at room temperature. Further, with the addition of two drops of triethylamine, the reaction was continued at 30° C. for 120 minutes.

After the completion of the reaction, dichloromethane was added to the reaction mixture, thereby extracting an organic layer therewith. The obtained organic layer was successively washed with a 3% aqueous solution of sodium hydroxide, a 2% aqueous solution of hydrochloric acid, and ion-exchange water, and caused to precipitate in methanol. Thus, 3.64 g of an aromatic polycarbonate resin No. 12 according to the present. invention having a repeat unit of the following formula was obtained in a yield of 98.1%.

[Aromatic polycarbonate resin No. 12]

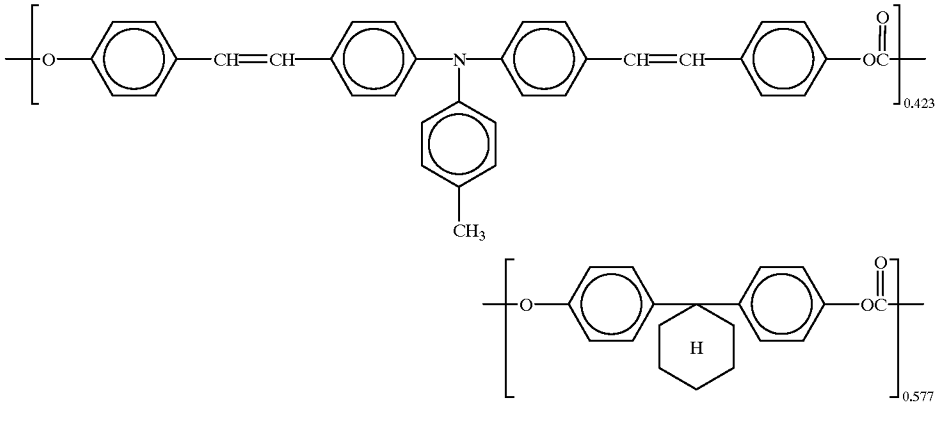

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 12 are shown in Table 1.

Figure 18:
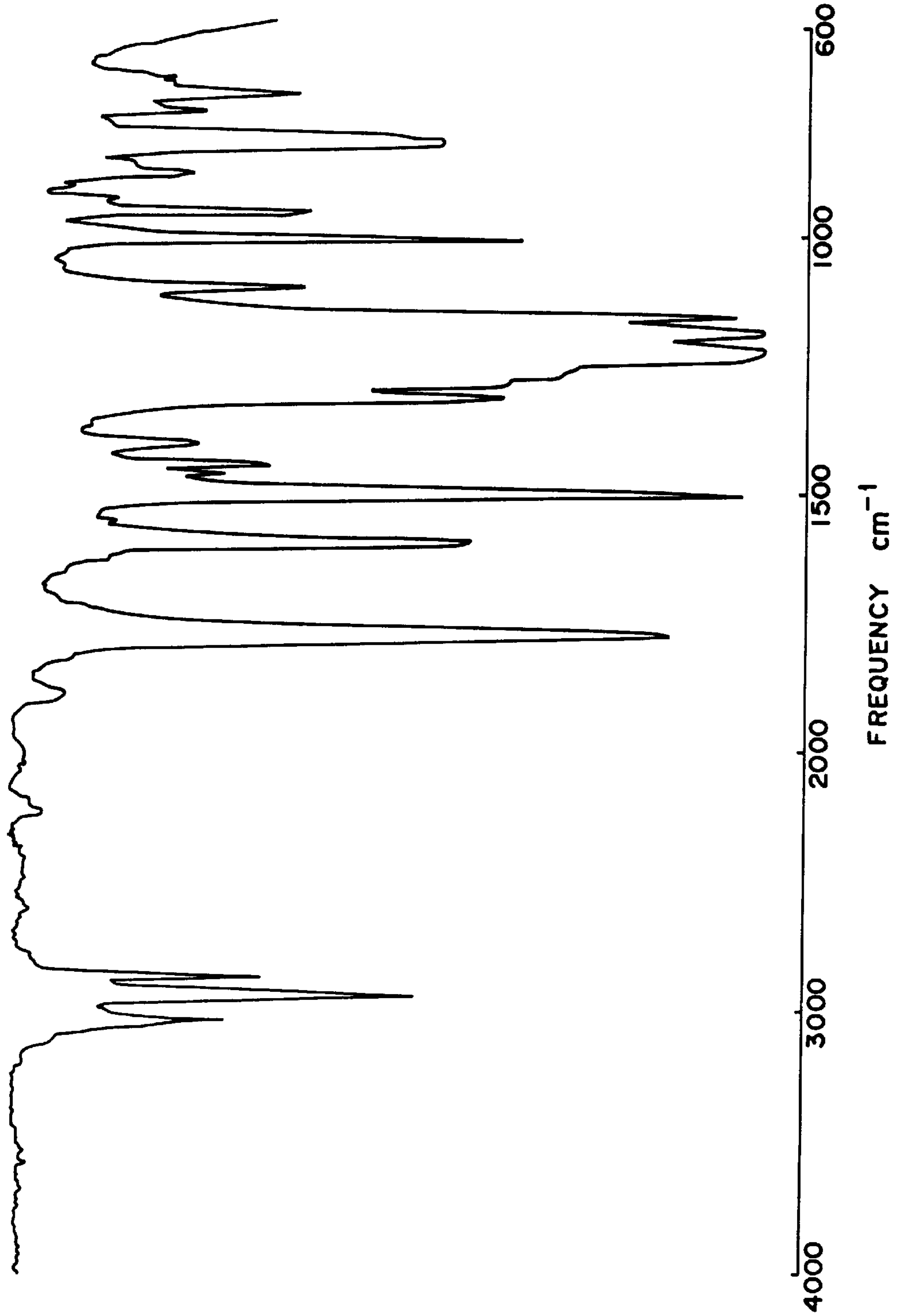

FIG. 18 shows an infrared spectrum of the aromatic polycarbonate resin No. 12 obtained in Example 1-12, taken by use of an NaCl film.

The IR spectrum indicates the appearance of the characteristic absorption peak due to C═O stretching vibration of carbonate at 1770 $cm^{-1}$.

EXAMPLES 1-13 and 1-14

[Synthesis of aromatic polycarbonate resins No. 13 and No. 14]

The procedure for preparation of the aromatic polycarbonate resin No. 12 in Example 1-12 was repeated except that 1,1-bis(4-hydroxyphenyl)cyclohexane used in Example 1-12 was replaced by the respective diol compounds.

Thus, aromatic polycarbonate resins No. 13 and No. 14 according to the present invention were obtained, respectively having repeat units of the following formulae:

[Aromatic polycarbonate resin No. 13]

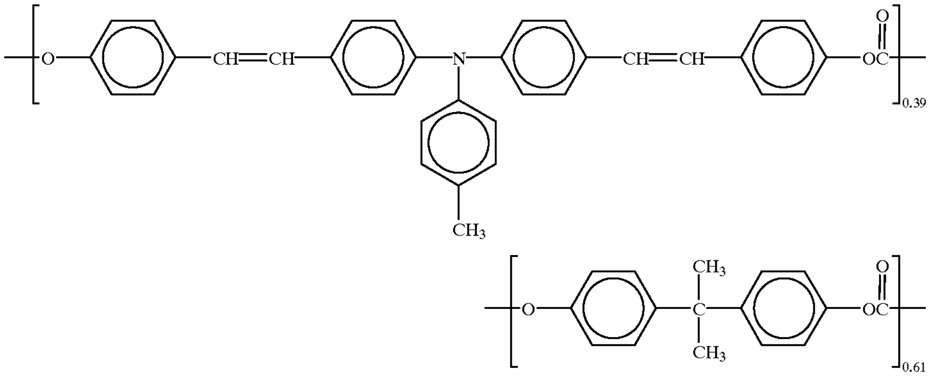

[Aromatic polycarbonate resin No. 14]

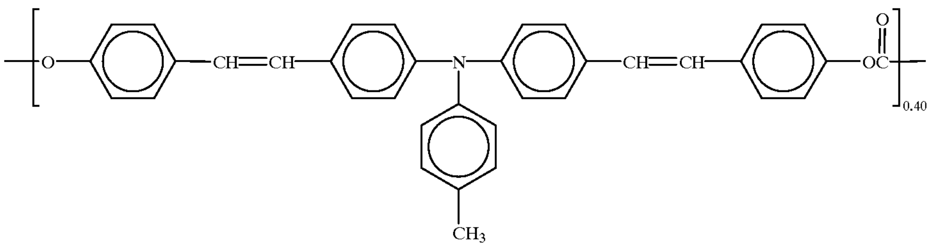

-continued

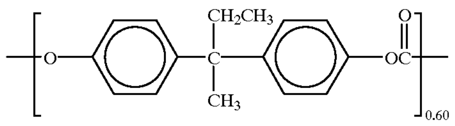

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 13 and No. 14 are shown in Table 1.

Figure 19:
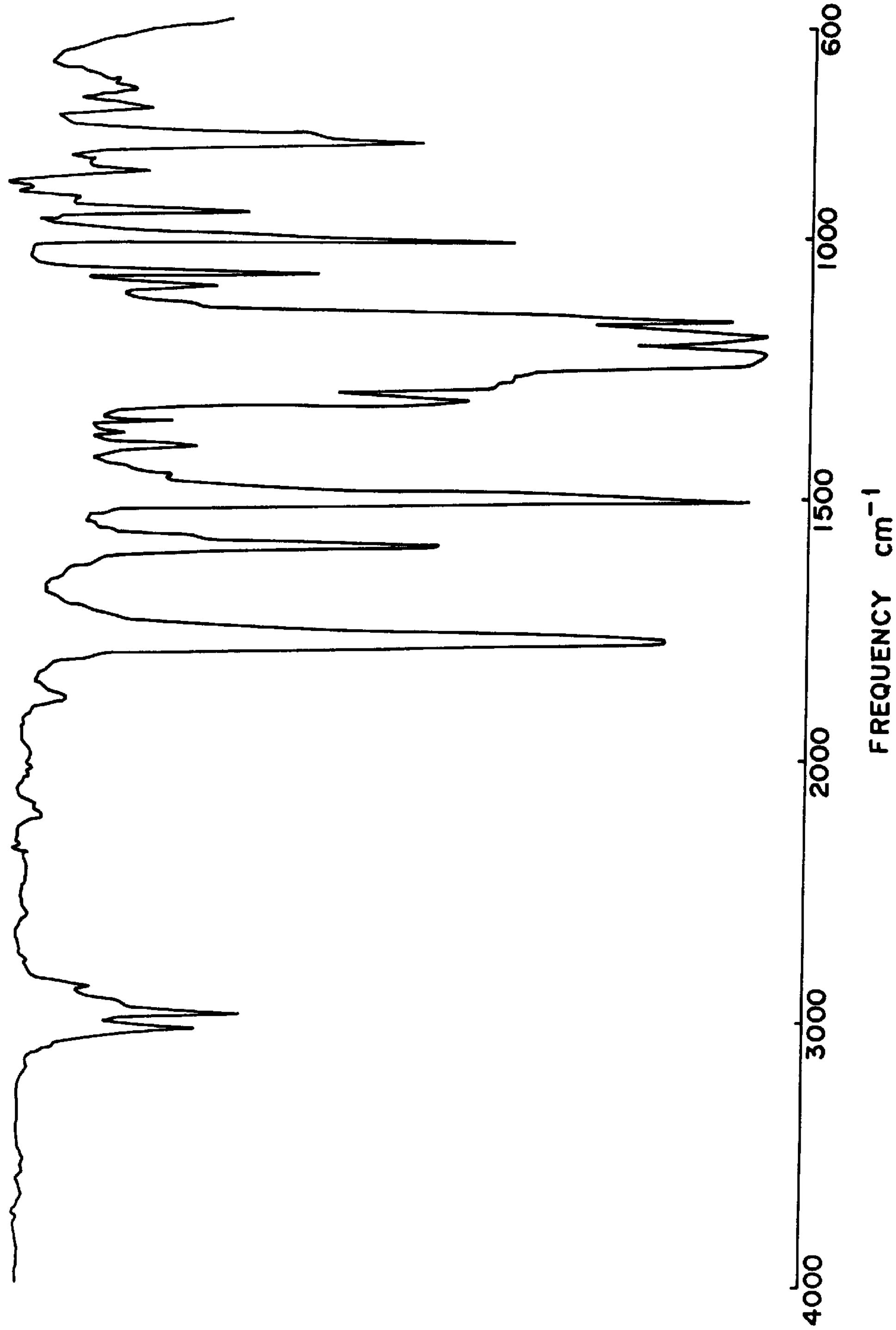
Figure 20:
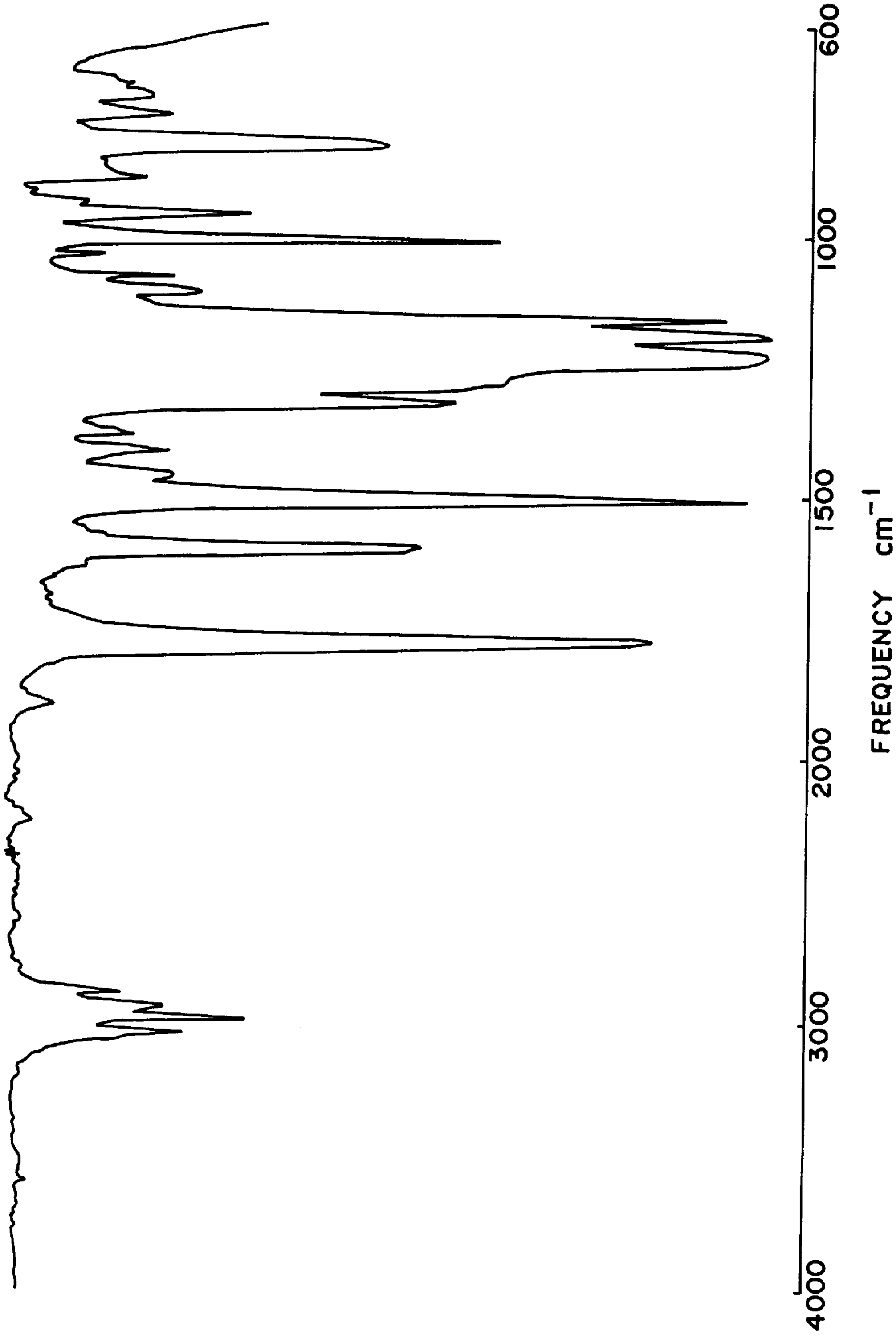

FIGS. 19 and 20 respectively show infrared spectra of the aromatic polycarbonate resins No. 13 and No. 14 obtained in Examples 1-13 and 1-14, taken by use of an NaCl film.

EXAMPLE 1-15

[Synthesis of aromatic polycarbonate resin No. 15]

2.97 g (6.0 mmol) of N,N-bis[4-(4-hydroxystyryl)phenyl]-N-(4-methylphenyl)amine obtained in Preparation Example 5, represented by formula (5), and 0.018 g of 4-tert-butylphenol were placed into a reaction vessel. An aqueous solution prepared by dissolving 0.96 g of sodium hydroxide and 0.07 g of sodium hydrosulfite in 50 ml of water was added to the above-mentioned mixture in the reaction vessel in a stream of argon gas, and a mixture thus obtained was stirred. A solution prepared by dissolving 1.07 g of triphosgene in 35 ml of dichloromethane was added dropwise to the above-mentioned mixture over a period of 4 minutes with vigorously stirring under ice-cooled condition, thereby forming an emulsion with the progress of a reaction.

Thereafter, 0.14 g of sodium hydroxide was added to the reaction mixture at room temperature. Further, with the addition of two drops of triethylamine, the reaction was continued at 30° C. for 120 minutes.

After the completion of the reaction, dichloromethane was added to the reaction mixture, thereby extracting an organic layer therewith. The obtained organic layer was successively washed with a 3% aqueous solution of sodium hydroxide, a 2% aqueous solution of hydrochloric acid, and ion-exchange water, and caused to precipitate in methanol. Thus, 2.80 g of an aromatic polycarbonate resin No. 15 according to the present invention having a repeat unit of the following formula was obtained in a yield of 89.2%.

[Aromatic polycarbonate resin No. 15]

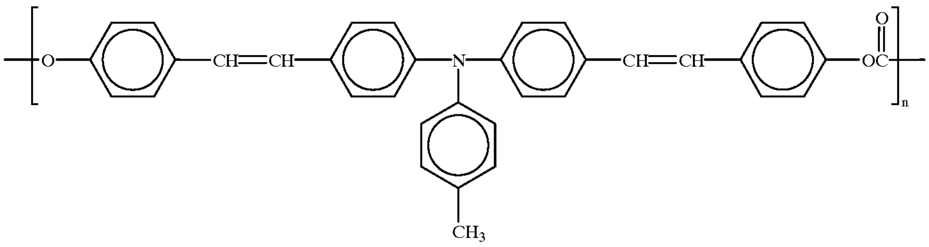

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 15 are shown in Table 1.

Figure 21:
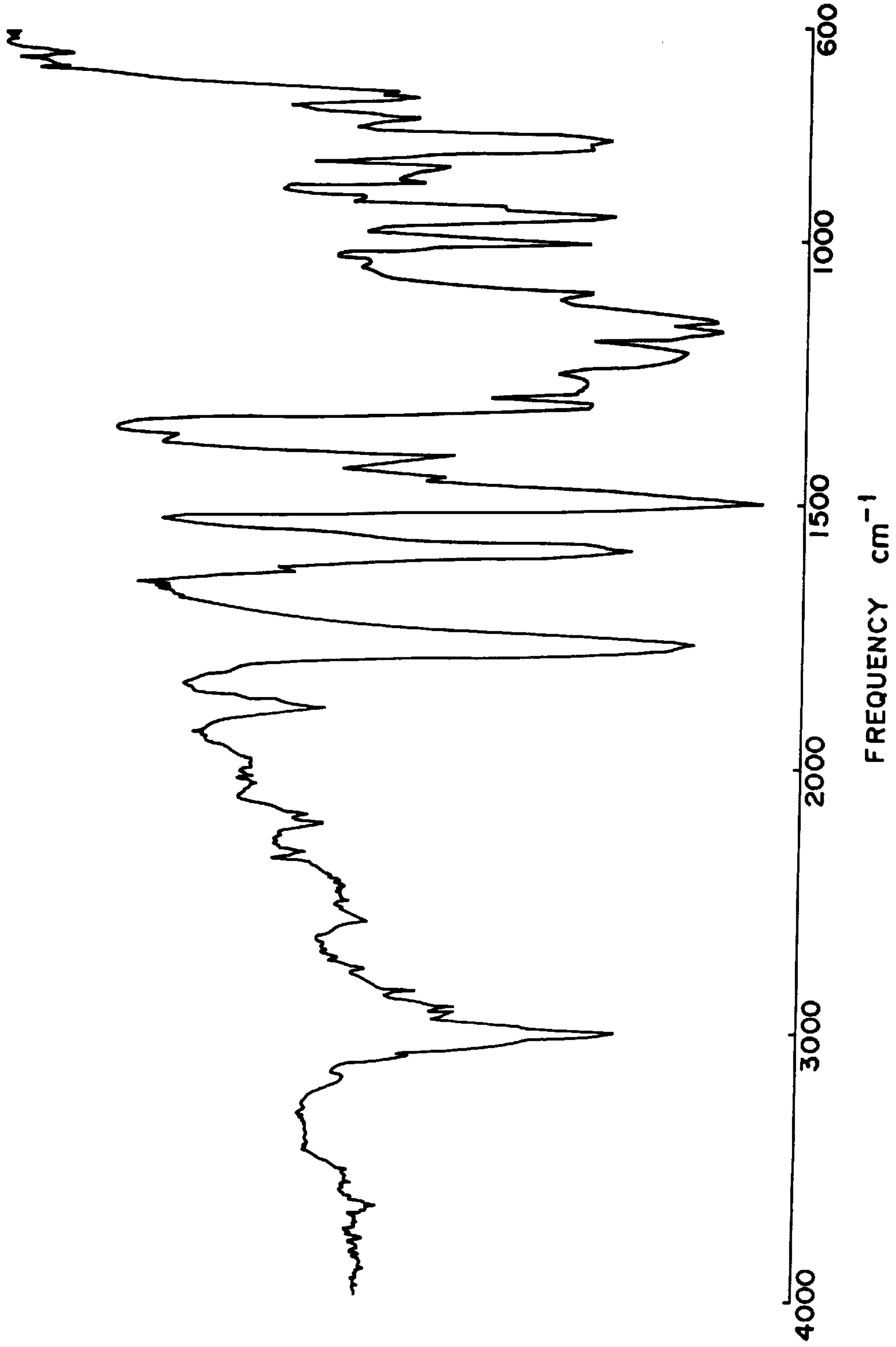

FIG. 21 shows an infrared spectrum of the aromatic polycarbonate resin No. 15 obtained in Example 1-15, taken by use of an NaCl film.

The IR spectrum indicates the appearance of the characteristic absorption peak due to C═O stretching vibration of carbonate at 1770 $cm^{-1}$.

EXAMPLE 2-1

[Fabrication of Photoconductor No. 1]

(Formation of intermediate layer)

A commercially available polyamide resin (Trademark "C.M-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.

(Formation of charge generation layer)

TABLE 1

| Example No. | Tg (° C.) | Molecular Weight (*) Mn | Mw | Elemental Analysis % C Found (Calcd.) | % H Found (Calcd.) | % N Found (Calcd.) |
|---|---|---|---|---|---|---|
| 1-1 | 114.9 | 32300 | 112000 | 75.09 (75.33) | 5.37 (5.40) | 2.04 (2.14) |
| 1-2 | 63.0 | 27500 | 66200 | 74.93 (75.19) | 6.78 (6.61) | 1.71 (1.78) |
| 1-3 | 112.5 | 20000 | 46300 | 77.42 (77.57) | 5.93 (5.90) | 2.02 (2.10) |
| 1-4 | 154.3 | 8400 | 23500 | 80.31 (80.50) | 5.22 (5.33) | 1.69 (1.81) |
| 1-5 | 129.1 | 15400 | 34400 | 75.07 (75.33) | 5.29 (5.40) | 2.06 (2.14) |
| 1-6 | 131.0 | 17500 | 34600 | 74.95 (75.19) | 6.62 (6.61) | 1.68 (1.78) |
| 1-7 | 73.6 | 15400 | 33500 | 77.55 (77.57) | 5.86 (5.90) | 2.00 (2.10) |
| 1-8 | 156.3 | 14000 | 30000 | 75.45 (75.33) | 5.36 (5.40) | 2.06 (2.14) |
| 1-9 | 119.5 | 14400 | 29000 | 75.23 (75.19) | 6.65 (6.61) | 1.80 (1.78) |
| 1-10 | 117.7 | 15000 | 29000 | 77.64 (77.57) | 5.92 (5.90) | 1.97 (2.10) |
| 1-11 | 69.0 | 9100 | 24000 | 80.48 (80.50) | 5.30 (5.33) | 1.63 (1.81) |
| 1-12 | 209.5 | 66200 | 161200 | 80.48 (80.57) | 5.61 (5.63) | 1.79 (1.51) |
| 1-13 | 200.1 | 58500 | 158300 | 79.45 (79.71) | 5.25 (5.36) | 1.75 (1.52) |
| 1-14 | 196.1 | 51600 | 142300 | 80.02 (79.94) | 5.49 (5.56) | 1.79 (1.51) |
| 1-15 | 252.5 | 33700 | 78100 | 82.63 (82.57) | 5.63 (5.58) | 2.68 (2.68) |

(*) The molecular weight is expressed by a polystyrene-reduced value.

A coating liquid for a charge generation layer was prepared by dispersing a bisazo compound of the following formula (hereinafter referred to as "Pig. 1"), serving as a charge generation material, in a mixed solvent of cyclohexanone and methyl ethyl ketone in a ball mill. The thus obtained coating liquid was coated on the above prepared intermediate layer by a doctor blade, and dried at room temperature. Thus, a charge generation layer with a thickness of about 1 μm was formed on the intermediate layer.

[Bisazo compound (Pig. 1) ]

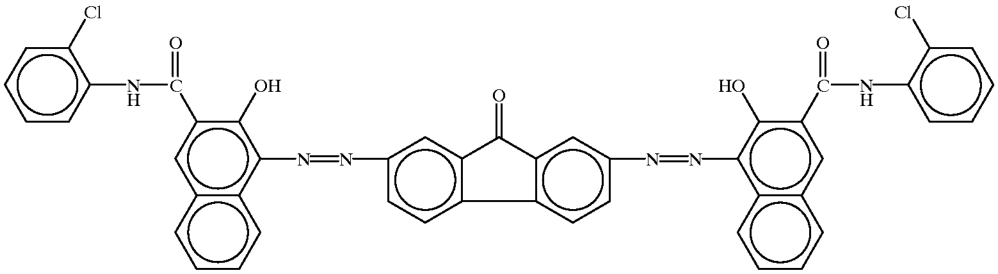

[Formation of charge transport layer]

The aromatic polycarbonate resin No. 1 of the present invention prepared in Example 1-1, serving as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of about 20 μm was provided on the charge generation layer.

Thus, an electrophotographic photoconductor No. 1 according to the present invention was fabricated.

EXAMPLES 2-2 to 2-15

The procedure for. fabrication of the electrophotographic photoconductor No. 1 in Example 2-1 was repeated except that the aromatic polycarbonate resin No. 1 for use in the charge transport layer coating liquid in Example 2-1 was replaced by the respective aromatic polycarbonate resins as shown in Table 2.

Thus, electrophotographic photoconductors No. 2 to No. 15 according to the present invention were fabricated.

EXAMPLES 2-16

The procedure for fabrication of the electrophotographic photoconductor No. 1 in Example 2-1 was repeated except that the bisazo compound "Pig. 1" for use in the charge generation layer coating liquid in Example 2-1 was replaced by a trisazo compound (hereinafter referred to as "Pig. 2. ") of the following formula:

[Trisazo compound (Pig. 2) ]

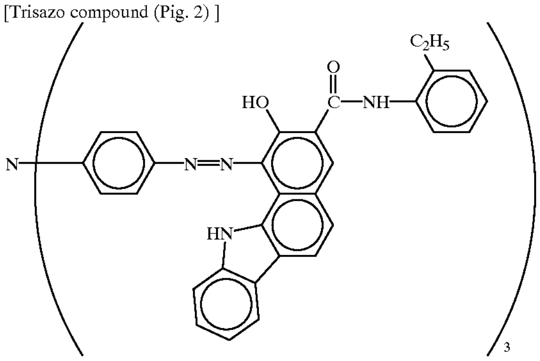

Thus, an electrophotographic photoconductor No. 16 according to the present invention was fabricated.

EXAMPLES 2-17 to 2-26

The procedure for fabrication of the electrophotographic photoconductor No. 16 in Example 2-16 was repeated except that the aromatic polycarbonate resin No. 1 for use in the charge transport layer coating liquid in Example 2-16 was replaced by the respective aromatic polycarbonate resins as shown in Table 2.

Thus, electrophotographic photoconductors No. 17 to No. 26 according to the present invention were fabricated.

Each of the electrophotographic photoconductors No. 1 through No. 26 according to the present invention obtained in Examples 2-1 to 2-26 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). Then, each electrophotographic photoconductor was allowed to stand in the dark for 20 seconds without applying any charge thereto, and the surface potential Vo (V) of the photoconductor was measured. Each photoconductor was then illuminated by a tungsten lamp in such a manner that the illuminance on the illuminated surface of the photoconductor was 4.5 lux, and the exposure $E_{1/2}$ (lux•sec) required to reduce the initial surface potential Vo (V) to ½ the initial surface potential Vo (V) was measured. The results are shown in Table 2.

TABLE 2

| Example No. | CGM | Aromatic Polycarbonate Resin No. | -Vo (V) | $E_{1/2}$ (lux.sec) |
|---|---|---|---|---|
| 2-1 | Pig.1 | No. 1 | 769 | 0.64 |
| 2-2 | Pig.1 | No. 2 | 983 | 0.83 |
| 2-3 | Pig.1 | No. 3 | 921 | 0.71 |
| 2-4 | Pig.1 | No. 4 | 515 | 0.61 |
| 2-5 | Pig.1 | No. 8 | 797 | 0.71 |
| 2-6 | Pig.1 | No. 10 | 780 | 0.78 |
| 2-7 | Pig.1 | No. 9 | 1030 | 0.96 |
| 2-8 | Pig.1 | No. 11 | 646 | 1.17 |
| 2-9 | Pig.1 | No. 5 | 618 | 0.64 |
| 2-10 | Pig.1 | No. 7 | 680 | 0.69 |
| 2-11 | Pig.1 | No. 6 | 994 | 0.87 |
| 2-12 | Pig.1 | No. 12 | 1283 | 1.03 |
| 2-13 | Pig.1 | No. 13 | 1284 | 0.97 |
| 2-14 | Pig.1 | No. 14 | 1316 | 1.10 |
| 2-15 | Pig.1 | No. 15 | 1320 | 0.92 |
| 2-16 | Pig.2 | No. 1 | 790 | 0.63 |
| 2-17 | Pig.2 | No. 2 | 975 | 0.66 |
| 2-18 | Pig.2 | No. 3 | 570 | 0.45 |
| 2-19 | Pig.2 | No. 4 | 512 | 0.45 |
| 2-20 | Pig.2 | No. 8 | 438 | 0.46 |
| 2-21 | Pig.2 | No. 10 | 240 | 0.33 |
| 2-22 | Pig.2 | No. 9 | 347 | 0.40 |
| 2-23 | Pig.2 | No. 11 | 82 | 0.55 |
| 2-24 | Pig.2 | No. 5 | 700 | 0.52 |
| 2-25 | Pig.2 | No. 7 | 650 | 0.43 |
| 2-26 | Pig.2 | No. 6 | 920 | 0.71 |

Furthermore, each of the above obtained electrophotographic photoconductors No. 1 to No. 26 was set in a commercially available electrophotographic copying machine, and the photoconductor was charged and exposed to light images via the original images to form latent electrostatic images thereon. Then, the latent electro-static images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the aromatic polycarbonate resin for use in the photoconductive layer of the electrophotographic photoconductor according to the present invention comprises a repeat unit of formula (I), (II), (IV) or (V), each having a triarylamine structure in its main chain. Alternatively, the aromatic polycarbonate resin of the present invention comprises such a repeat unit of formula (II) or (V) having a triarylamine structure in its main chain, and a repeat unit of formula (III). Any of the above-mentioned aromatic polycarbonate resins have the charge transporting properties and high mechanical strength, so that the photosensitivity and durability of the photoconductor are sufficiently high.

Japanese Patent Application No. 7–327366 filed Dec. 15, 1995, Japanese Patent Application No. 8-009392 filed Jan. 23, 1996 and Japanese Patent Application No. 8-012931 filed Jan. 29, 1996 are hereby incorporated by reference.

What is claimed is:

1. An aromatic polycarbonate resin having a repeat unit of formula (I):

(I)

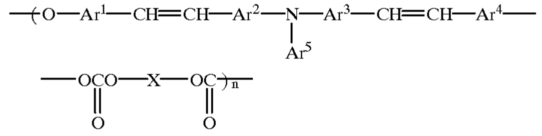

wherein n is an integer of 5 to 5000; $Ar^1$, $Ar^2$, $Ar^3$ and $Ar^4$, which may be the same or different, represent a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; and X is a bivalent aliphatic group, a bivalent cyclic aliphatic group, or

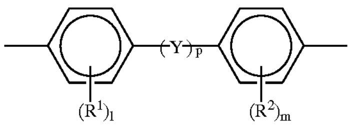

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, —$SO_2$—,

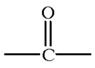 , 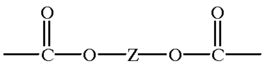 , or

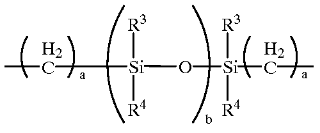

in which z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

2. The aromatic polycarbonate resin as claimed in claim 1, wherein said repeat unit of formula (I) is represented by formula (IV):

(IV)

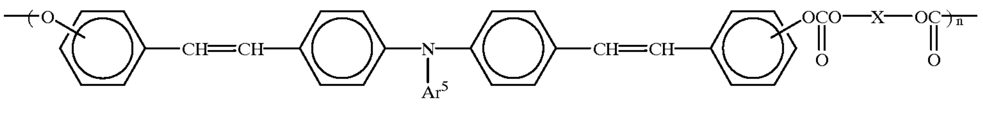

wherein n is an integer of 5 to 5000; $Ar^5$ is an aromatic hydrocarbon group which may have a a substituent, or a heterocyclic group which may have a substituent; and X is a bivalent aliphatic group, a bivalent cyclic aliphatic group, or

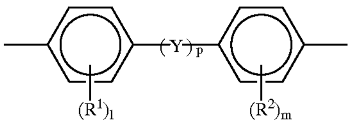

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, $—SO_2—$,

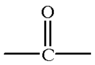 , 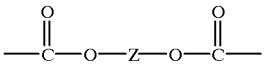 , or

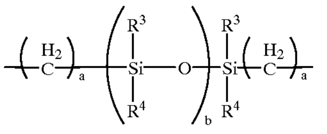

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

3. The aromatic polycarbonate resin as claimed in claim 1, wherein said bivalent aromatic hydrocarbon group represented by $Ar^1$, $Ar^2$, $Ar^3$ and $Ar^4$ is a bivalent group derived from one aromatic hydrocarbon group selected from the group consisting of benzene, naphthalene, biphenyl terphenyl, pyrene, fluorene, and 9,9-dimethylfluorene.

4. The aromatic polycarbonate resin as claimed in claim 1, wherein said bivalent heterocyclic group represented by $Ar^1$, $Ar^2$, $Ar^3$ and $Ar^4$ is a bivalent group derived from one heterocyclic group selected from the group consisting of thiophene, banzothiophene, furan, benzofuran and carbazole.

5. The aromatic polycarbonate resin as claimed in claim 1, wherein said bivalent heterocyclic group represented by $Ar^1$, $Ar^2$, $Ar^3$ and $Ar^4$ is diphenyl ether group in which two aryl groups are bonded via oxygen, or diphenyl thioether group in which two aryl groups are bonded via sulfur.

6. The aromatic polycarbonate resin as claimed in claim 1, wherein said substituent for said bivalent aromatic hydrocarbon group and said bivalent heterocyclic group represented by $Ar^1$, $Ar^2$, $Ar^3$ and $Ar^4$ is selected from the group consisting of a halogen atom, cyano group, nitro group, an alkyl group having 1 to 12 carbon atoms, an alkoxyl group having 1 to 12 carbon atoms, an aryloxy group, a substituted mercapto group, an arylmercapto group, a substituted amino group, an alkylonedioxy group, an alkylenedithio group, and an acyl group.

7. The aromatic polycarbonato resin as claimed in claim 1, wherein said aromatic hydrocarbon group represented by $Ar^5$ is an aromatic hydrocarbon group selected from the group consisting of phonyl group, biphenylyl group, terphenylyl group, naphthyl group, anthryl group, pyrenyl group, fluorenyl group, 9,9-dimethyl-2-fluorenyl group, azulenyl group, triphenylenyl group, chrysenyl group, and a group of formula (XI):

(XI)

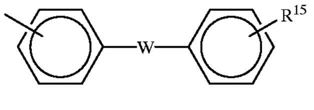

wherein W is selected from the group consisting of —O—, —S—, —SO—, $—SO_2—$, —CO—,

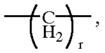 , and 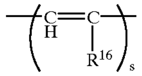

in which $R^{15}$ is a hydrogen atom, an alkyl group which may have a substituent, an alkoxyl group, a halogen atom, an aromatic hydrocarbon group which may have a substituent, nitro group, cyano group, or a substituted amino group; $R^{16}$ is a hydrogen atom, an alkyl group which may have a substituent, or an aromatic hydrocarbon group which may have a substituent; and r and s are each independently an integer of 1 to 12.

8. The aromatic polycarbonate resin as claimed in claim 1, wherein said heterocyclic group represented by $Ar^5$ is a heterocyclic group selected from the group consisting of thienyl group, benzothienyl group, furyl group, benzofuranyl group and carbazolyl group.

9. The aromatic polycarbonate resin as claimed in claim 1, wherein said substituent for said aromatic hydrocarbon group and said heterocyclic group represented by $Ar^5$ is selected from the group consisting of a halogen atom, cyano group, nitro group, an alkyl group having 1 to 12 carbon atoms, an alkoxyl group having 1 to 12 carbon atoms, an aryloxy group, a substituted mercapto group, an arylmercapto group, a substituted amino group, an alkylonedioxy group, an alkylenedithio group, and an acyl group.

10. The aromatic polycarbonate resin as claimed in claim 1, wherein said alkyl group represented by $R^1$ to $R^4$ has 1 to 12 carbon atoms.

11. The aromatic polycarbonate resin as claimed in claim 1, wherein said aromatic hydrocarbon group represented by $R^1$ to $R^4$ is elected from the group consisting of phenyl group which may have a substituent and biphenylyl group which may have a substituent.

12. An aromatic polycarbonate resin having a repeat unit of formula (II) and a repeat unit of formula (III), with the composition ratio of the repeat unit of formula (II) to the repeat unit of formula (III) being in the relationship of $0<k/(k+j)\leqq 1$;

(II)

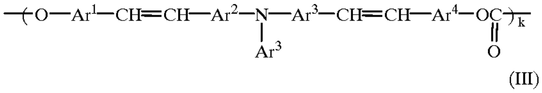

(III)

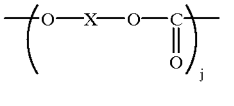

wherein k is an integer of 5 to 5000; j is an integer of 0 to 5000; $Ar^1$, $Ar^2$, $Ar^3$ and $Ar^4$, which may be the same or different, represent a bivalent aromatic hydrocarbon group which may have a substituent, or a bivalent heterocyclic group which may have a substituent; $Ar^5$ is an aromatic hydrocarbon group which may have a substituent, or a heterocyclic group which may have a substituent; and X is a bivalent aliphatic group, a bivalent cyclic aliphatic group, or

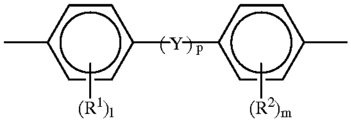

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, —$SO_2$—,

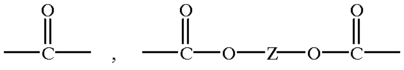

, or

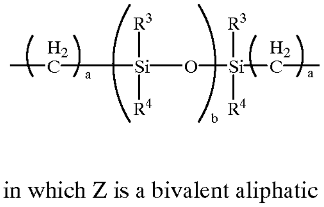

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

13. The aromatic polycarbonate resin as claimed in claim 12, wherein said repeat unit of formula (II) is represented by formula (V):

(V)

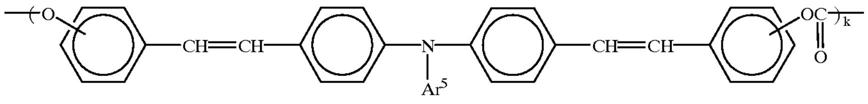

wherein k is an integer of 5 to 5000; and $Ar^5$ is an aromatic hydrocarbon group which may have a substituent, or a heterocyclic group which may have a substituent.

14. The aromatic polycarbonate resin as claimed in claim 12, wherein said bivalent aromatic hydrocarbon group represented by $Ar^1$, $Ar^2$, $Ar^3$ and $Ar^4$ is a bivalent group derived from one aromatic hydrocarbon group selected from the group consisting of benzene, naphthalene, biphenyl terphenyl, pyrene, fluorene, and 9,9-dimethylfluorene.

15. The aromatic polycarbonate resin as claimed in claim 12, wherein said bivalent heterocyclic group represented by $Ar^1$, $Ar^2$, $Ar^3$ and $Ar^4$ is a bivalent group derived from one heterocyclic group selected from the group consisting of thiophene, benzothiophene, furan, benzofuran and carbazole.

16. The aromatic polycarbonate resin as claimed in claim 12, wherein said bivalent heterocyclic group represented by $Ar^1$, $Ar^2$, $Ar^3$ and $Ar^4$ is diphenyl ether group in which two aryl groups are bonded via oxygen, or diphenyl thioether group in which two aryl groups are bonded via sulfur.

17. The aromatic polycarbonate resin as claimed in claim 12, wherein said substituent for said bivalent aromatic hydrocarbon group and said bivalent heterocyclic group represented by $Ar^1$, $Ar^2$, $Ar^3$ and $Ar^4$ is selected from the group consisting of a halogen atom, cyano group, nitro group, an alkyl group having 1 to 12 carbon atoms, an alkoxyl group having 1 to 12 carbon atoms, an aryloxy group, a substituted mercapto group, an arylmercapto group, a substituted amino group, an alkylenedioxy group, an alkylenedithio group, and an acyl group.

18. The aromatic polycarbonate resin as claimed in claim 12, wherein said aromatic hydrocarbon group represented by $Ar^5$ is an aromatic hydrocarbon group selected from the group consisting of phenyl group, biphenylyl group, terphenylyl group, naphthyl group, anthryl group, pyrenyl group, fluoranyl group, 9,9-dimethyl-2-fluorenyl group, asulenyl group, triphenylenyl group, chrysenyl group, and a group of formula (XI):

(XI)

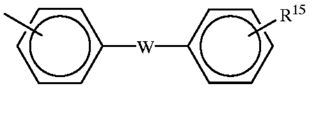

wherein W is selected from the group consisting of —O—, —S—, —SO—, —$SO_2$—, —CO—,

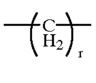

, and

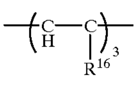

in which $R^{15}$ is a hydrogen atom, an alkyl group which may have a substituent, an alkoxyl group, a halogen atom, an aromatic hydrocarbon group which may have a substituent, nitro group, cyano group, or a substituted amino group; $R^{16}$ is a hydrogen atom, an alkyl group which may have a substituent, or an aromatic hydrocarbon group which may have a substituent; and r and s are each independently an integer of 1 to 12.

19. The aromatic polycarbonate resin as claimed in claim 12, wherein said heterocyclic group represented by $Ar^5$ is a heterocyclic group selected from the group consisting o f thienyl group, benzothienyl group, furyl group, benzofuranyl group and carbazolyl group.

20. The aromatic polycarbonate resin as claimed in claim 12, wherein said substituent for said aromatic hydrocarbon group and said heterocyclic group represented by $Ar^5$ is selected from the group consisting of a halogen atom, cyano group, nitro group, an alkyl group having 1 to 12 carbon atoms, an alkoxyl group having 1 to 12 carbon atoms, an aryloxy group, a substituted mercapto group, an arylmercapto group, a substituted amino group, an alkylonedioxy group, an alkylenedithio group, and an acyl group.

21. The aromatic polycarbonate resin an claimed in claim 12, wherein said alkyl group represented by $R^1$ to $R^4$ has 1 to 12 carbon atoms.

22. The aromatic polycarbonate resin as claimed in claim 12, wherein said aromatic hydrocarbon group represented by $R^1$ to $R^4$ is selected from the group consisting of phenyl group which may have a substituent and biphenylyl group which may have a subutituent.

* * * * *

UNITED STATES PATENT AND TRADEMARK OFFICE
CERTIFICATE OF CORRECTION

PATENT NO. : 6,191,249 B1
DATED : February 20, 2001
INVENTOR(S) : Chiaki Tanaka et al.

It is certified that error appears in the above-identified patent and that said Letters Patent is hereby corrected as shown below:

Title page,
ABSTRACT,
Line 17, "Ar1 to Ar3" should read -- Ar1 to Ar5 --.

Column 1,
Line 12, "electrophoto-graphic" should read -- electrophotographic --.

Column 2,
Line 16, "electrophoto-graphy" should read -- electrophotography --.
Line 28, "photo-conductor" should read -- photoconductor --.

Column 4,
Line 17, "—S—,—S—" should read -- —S— --.

Column 5,
Line 28, "$Ar_2$, $Ar_3$" should read -- $Ar^2$, $Ar^3$ --.

Column 15,
Lines 53-66, containing the chemical structure labeled as (XVII),

" 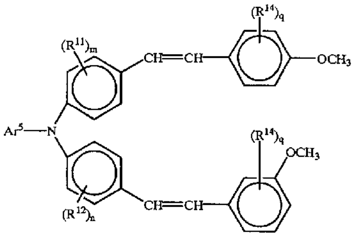 " should read

-- 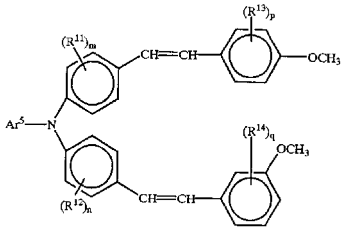 --

Column 16,
Lines 1-14, containing the chemical structure labeled (XVIII),

" 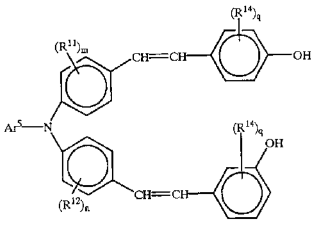 " should read

-- 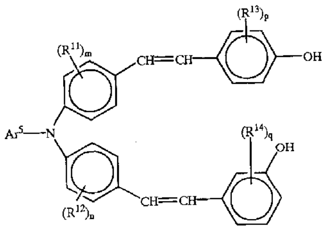 --

UNITED STATES PATENT AND TRADEMARK OFFICE
CERTIFICATE OF CORRECTION

PATENT NO. : 6,191,249 B1
DATED : February 20, 2001
INVENTOR(S) : Chiaki Tanaka et al.

It is certified that error appears in the above-identified patent and that said Letters Patent is hereby corrected as shown below:

Column 23,
Line 14, "transport layer 1," should read -- transport layer 4, --.
Line 50, "photo-conductor" should read -- photoconductor --.

Column 44,
Line 54, "present." should read -- present --.

Column 51,
Line 55, "for." should read -- for --.

Column 56,
Line 18, "phonyl" should read -- phenyl --.

Column 57,
Lines 16-20, containing the chemical structure labeled (II),

"
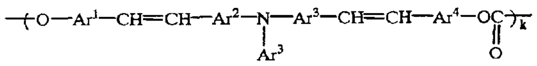
"

should read

--
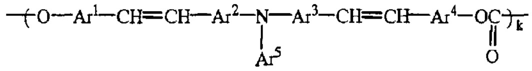
--

Column 58,
Line 48, "fluoranyl" should read -- florenyl --.

Column 59,
Line 9, "o f" should read -- of --.

UNITED STATES PATENT AND TRADEMARK OFFICE

CERTIFICATE OF CORRECTION

PATENT NO. : 6,191,249 B1
DATED : February 20, 2001
INVENTOR(S) : Chiaki Tanaka et al.

It is certified that error appears in the above-identified patent and that said Letters Patent is hereby corrected as shown below:

Column 60,
Line 4, "alkylonedioxy" should read -- alkylenedioxy --.

Signed and Sealed this

Tenth Day of September, 2002

*Attest:*

JAMES E. ROGAN

*Attesting Officer*

*Director of the United States Patent and Trademark Office*